United States Patent
Jones

(10) Patent No.: US 7,884,905 B2
(45) Date of Patent: Feb. 8, 2011

(54) LIQUID CRYSTAL DEVICE INCLUDING AN ALIGNMENT GRATING WITH BREAKS THEREIN

(75) Inventor: John Clifford Jones, Malvern (GB)

(73) Assignee: ZBD Displays Limited, Malvern (GB)

( * ) Notice: Subject to any disclaimer, the term of this patent is extended or adjusted under 35 U.S.C. 154(b) by 1362 days.

(21) Appl. No.: 10/543,884

(22) PCT Filed: Feb. 9, 2004

(86) PCT No.: PCT/GB2004/000519

§ 371 (c)(1),
(2), (4) Date: Jul. 29, 2005

(87) PCT Pub. No.: WO2004/070465

PCT Pub. Date: Aug. 19, 2004

(65) Prior Publication Data

US 2006/0139536 A1    Jun. 29, 2006

Related U.S. Application Data

(60) Provisional application No. 60/456,526, filed on Mar. 24, 2003.

(30) Foreign Application Priority Data

Feb. 7, 2003  (EP) .................................. 03250808

(51) Int. Cl.
*G02F 1/1337* (2006.01)
(52) U.S. Cl. .................. 349/129; 349/124; 349/130; 349/160
(58) Field of Classification Search .................. 349/124, 349/125, 129, 130, 160
See application file for complete search history.

(56) References Cited

U.S. PATENT DOCUMENTS

| | | | |
|---|---|---|---|
| 4,370,194 A * | 1/1983 | Shaver et al. | ................. 216/23 |
| 5,438,421 A | 8/1995 | Kano et al. | |
| 6,249,332 B1 | 6/2001 | Brown et al. | |
| 6,665,041 B2 * | 12/2003 | Liao et al. | ................... 349/160 |

FOREIGN PATENT DOCUMENTS

| WO | WO 9918474 A1 * | 4/1999 |
|---|---|---|
| WO | 02/08825 | 1/2002 |

OTHER PUBLICATIONS

International Search Report of PCT/GB2004/000519, mailed Jul. 6, 2004.

* cited by examiner

*Primary Examiner*—Michael H Caley
(74) *Attorney, Agent, or Firm*—Nixon & Vanderhye P.C.

(57) ABSTRACT

This invention relates to a liquid crystal device wherein the surface profile of a surface alignment grating stabilizes at least one stable state. The invention involves the introduction or breaks (34, 36, 38) or discontinuities into the grating (10) to divide the grating into a plurality of groove segments. The breaks are discontinuities in the grating in the groove direction, the grating having substantially the same groove direction on each side of the break. The introduction of breaks prevent free movement of defects along the groove of the grating and therefore help to stabilize the desired liquid crystal configuration, either a Defect state or a Continuous state. Suitable breaks involve gaps (34) in the groove ridges (30), necks (36) between the groove ridges (30) and slips or relative displacement (38) of the grating.

25 Claims, 29 Drawing Sheets

Schematic representation of the boundary between D state (front) and C state (back) defined by a negative break in the grating, i.e. a structure similar to that of figure 8a.

Director configurations at a convex surface

Director configurations at a concave surface

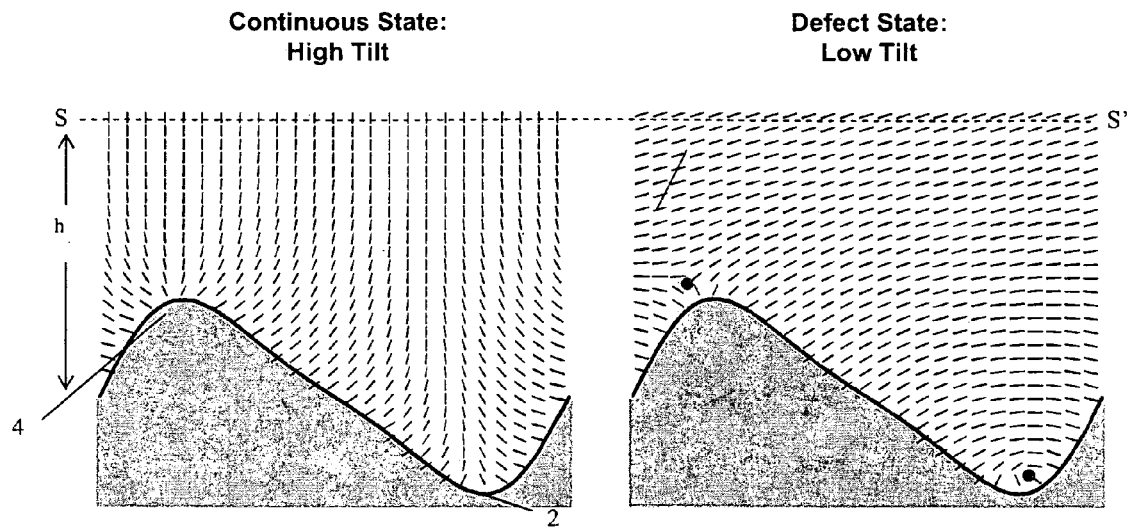
FIGURE 3  Example of two director configurations arising in the close vicinity to a surface relief structure with both convex and concave regions.
PRIOR ART
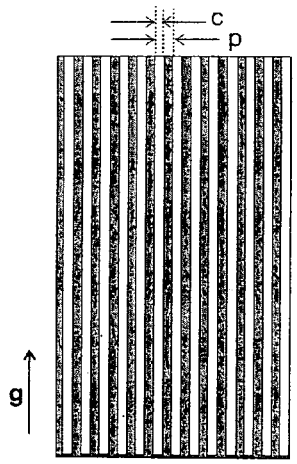
Fig. 4a
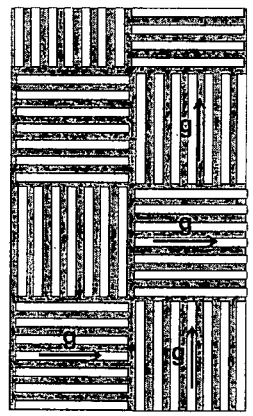
Fig. 4 b
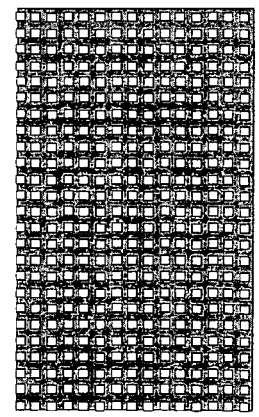
Fig. 4c
Plan views of grating designed according to the prior art: a) Uniform continuous grating, b) bi-directional (or multi-directional) grid; c) bigrating.

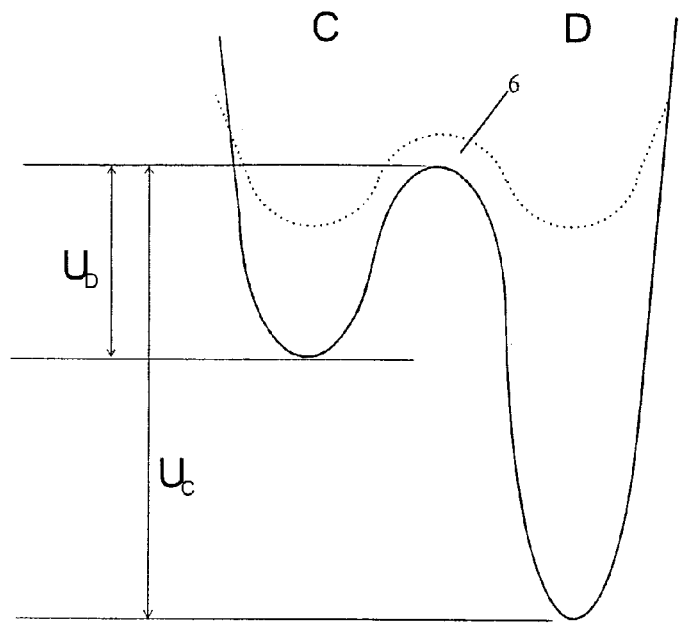
FIGURE 5   Schematic representation of the energy of the bistable states: Continuous C and Defect D.
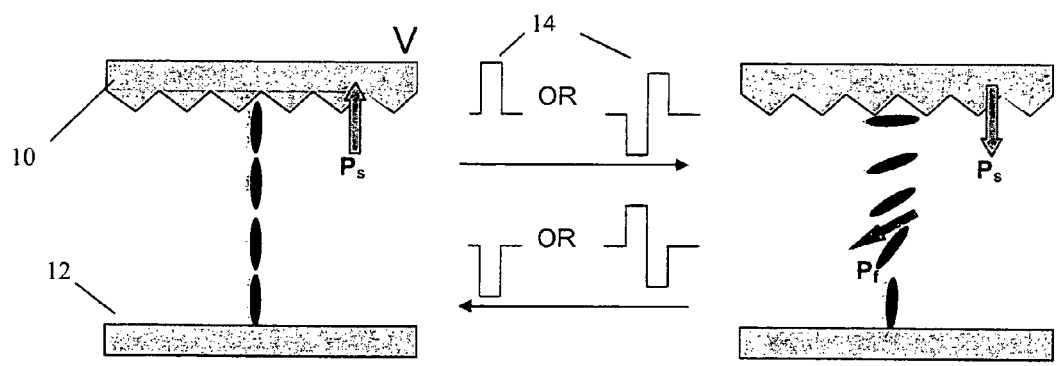
FIGURE 6   Schematic example of latching in a prior art device.

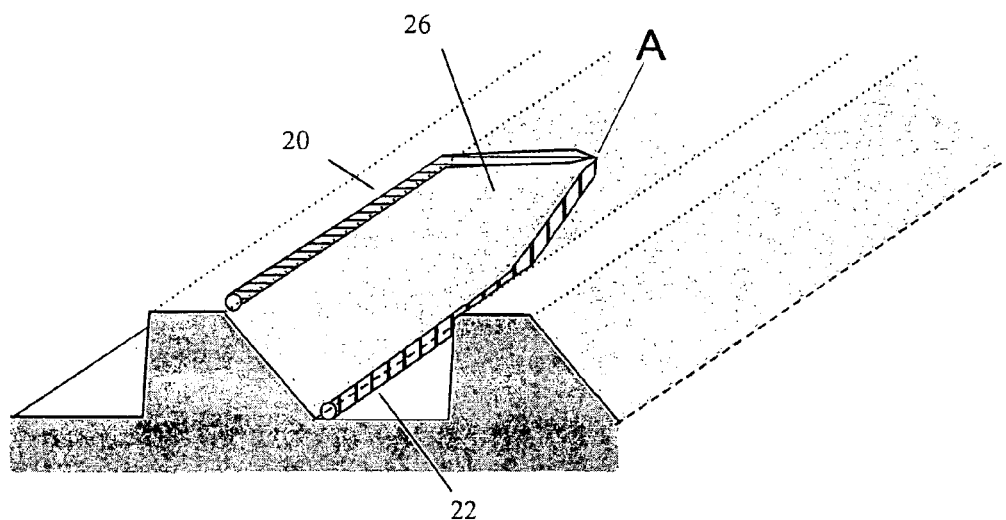
FIGURE 7  The boundary between C (rear) and D (front) states on a continuous grating.

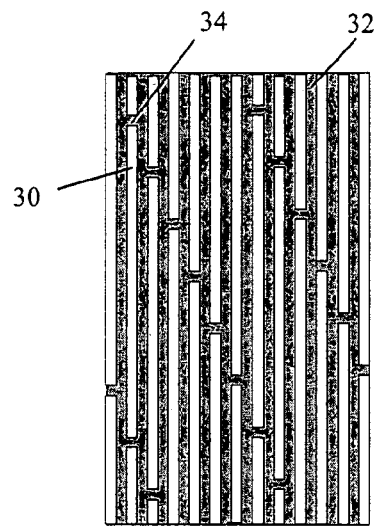
Fig. 8a Negative breaks – ("Gaps")
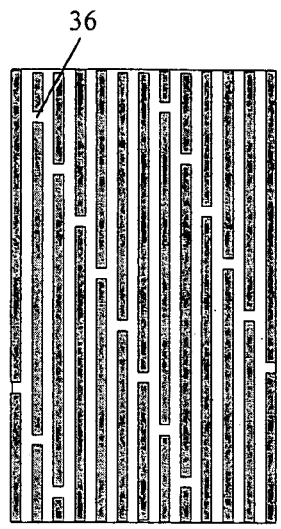
Fig. 8b Positive breaks – ("Necks")
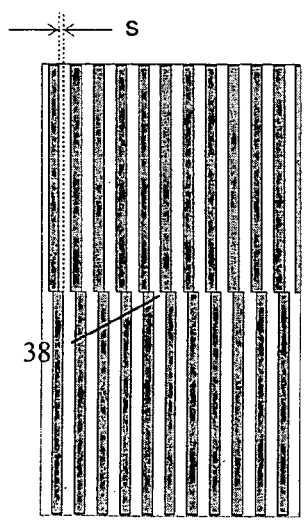
Fig. 8c Slip plane (phase = 2π.s/p)
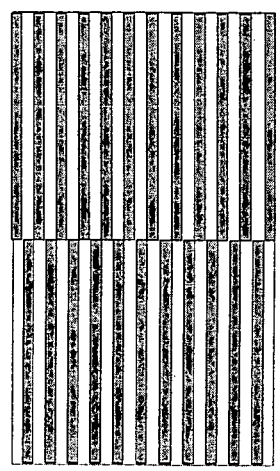
Fig. 8d π slip
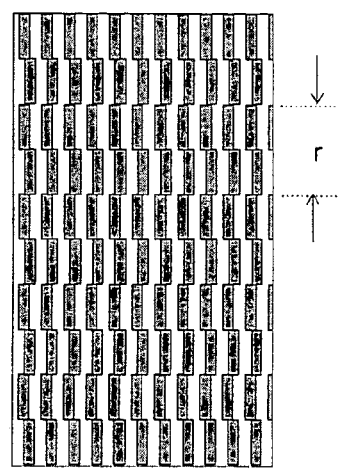
Fig. 8e Repeating slip pattern

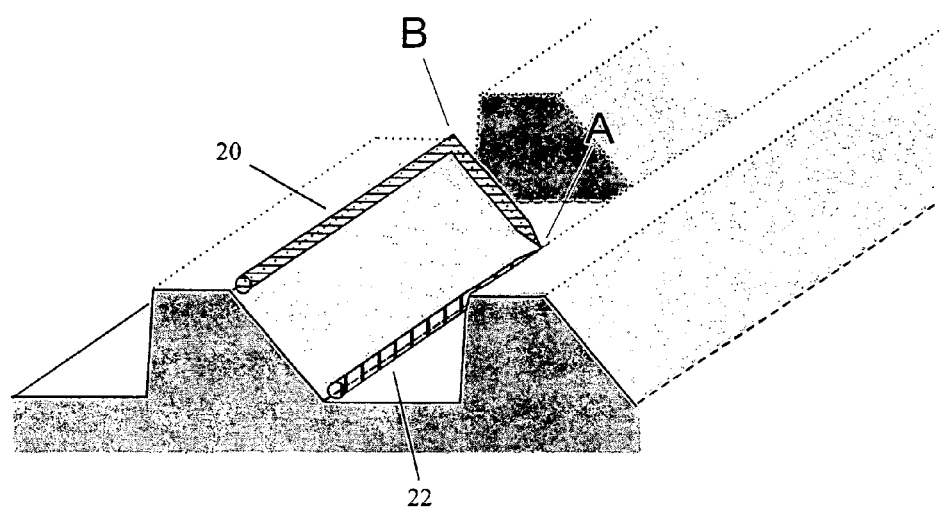
FIGURE 9  Schematic representation of the boundary between D state (front) and C state (back) defined by a negative break in the grating, i.e. a structure similar to that of figure 8a.

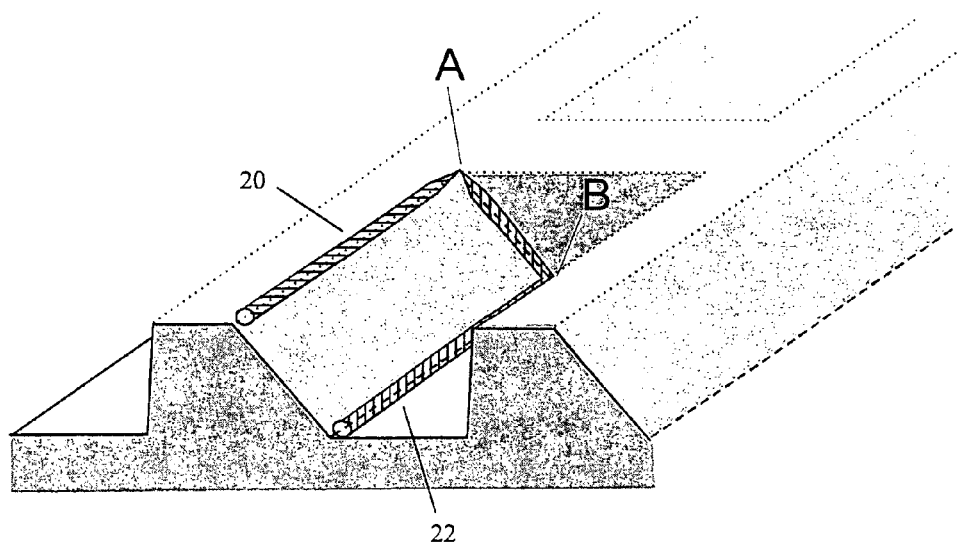
FIGURE 10  Schematic representation of the boundary between D state (front) and C state (back) defined by a positive break in the grating, i.e. a structure similar to that of figure 8b.
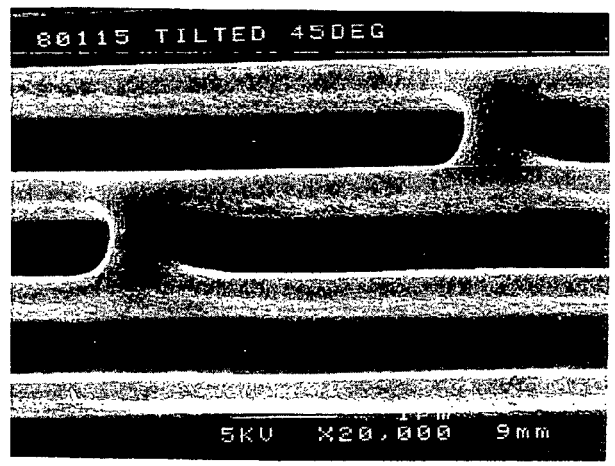
FIGURE 11  SEM photomicrograph of a grating neck used in the present invention.

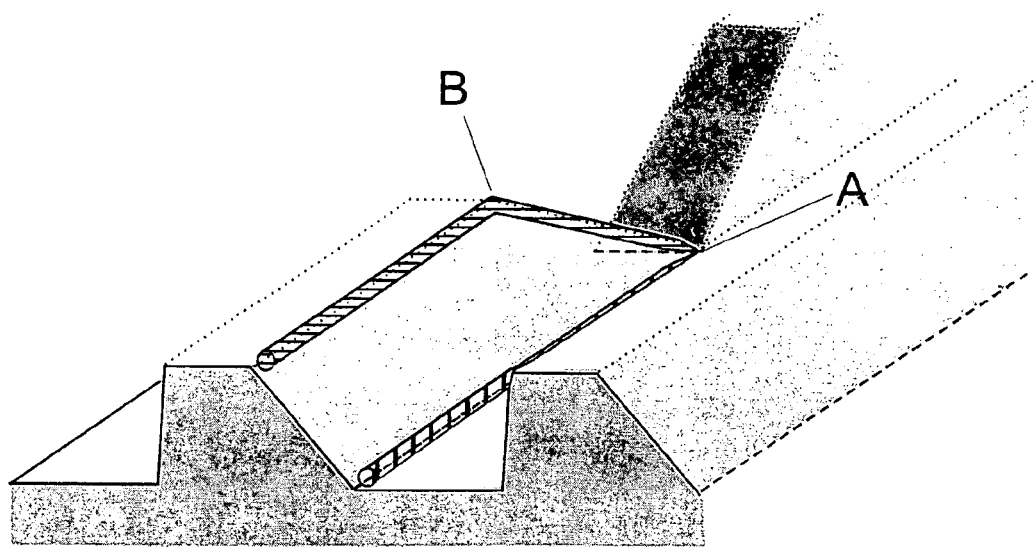
FIGURE 12  Schematic representation of the boundary between D state (front) and C state (back) defined by a negative break in the grating, i.e. a structure similar to that of figure 8a according to a further embodiment of the invention.

*magnification x 1000*

A partially latched pixel containing breaks (necks): *a)* immediately after latching, and *b)* 60 seconds later.

(*magnification x 200*)

Effect on ZBD latching thresholds as a function of gap size.

Effect on ZBD latching thresholds as a function of grating break density.

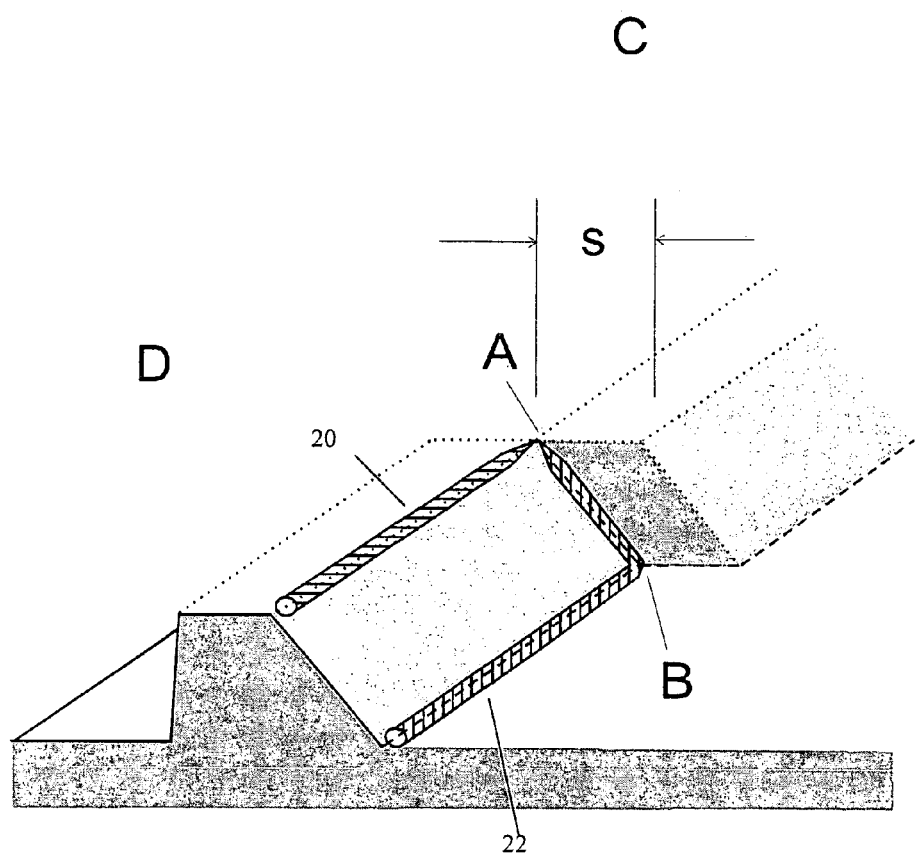
FIGURE 17   Schematic representation of the boundary between D state (front) and C state (back) defined by a slip break in the grating, i.e. a structure similar to that of figures 8c and 8d.

Two scenarios for the Defect configuration close to a slip.

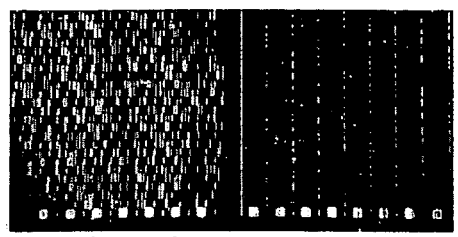
Fig. 19a  0 seconds
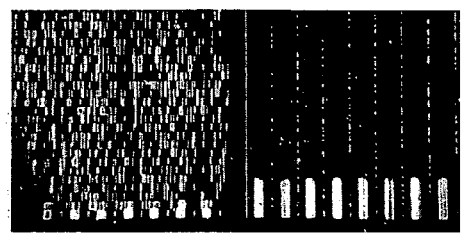
Fig. 19b  1 second
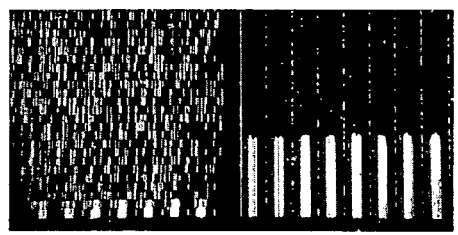
Fig. 19c  2 seconds
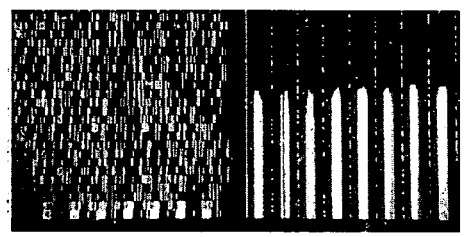
Fig. 19d  3 seconds
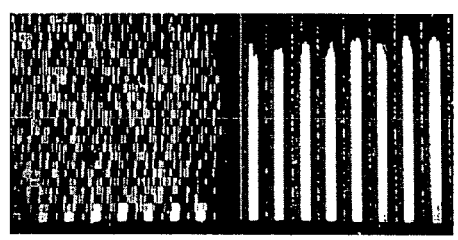
Fig. 19e  4 seconds
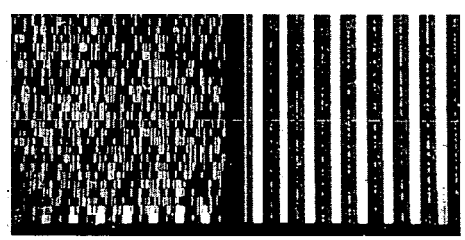
Fig. 19f  5 seconds
The action of slips on a ZBD cell held at 15°C below $T_{NI}$ (MLC 6204_000 at 50°C). (*magnification x 20*).

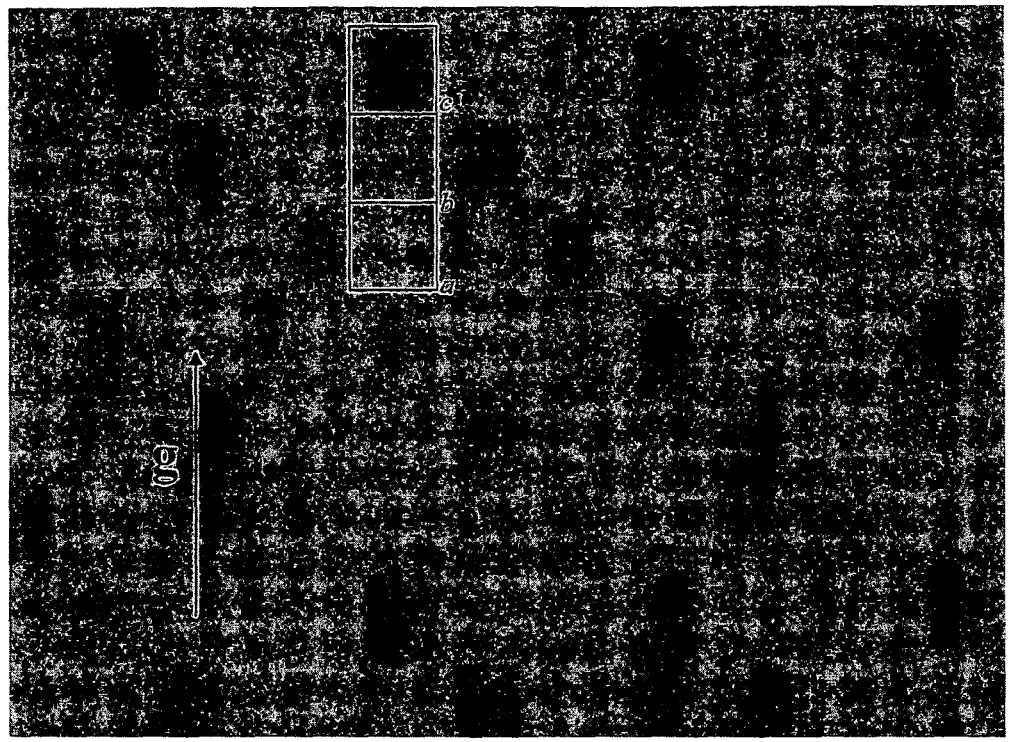
FIGURE 20 (*magnification x 1000*).

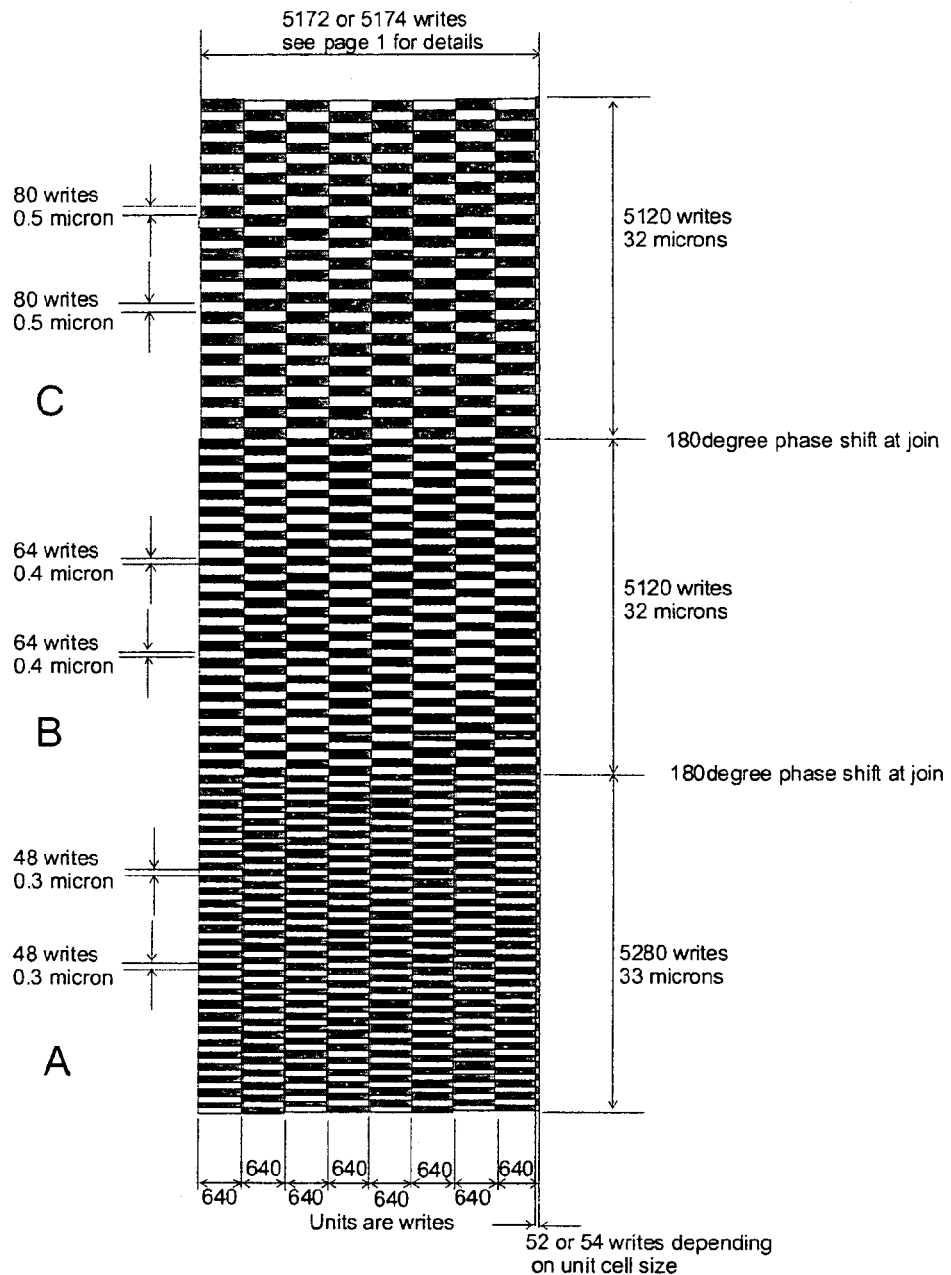
FIGURE 21  Example of grating design with areas of different pitch, and incorporating slips according to the present invention.

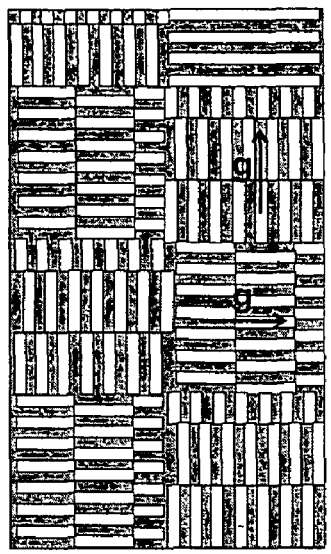 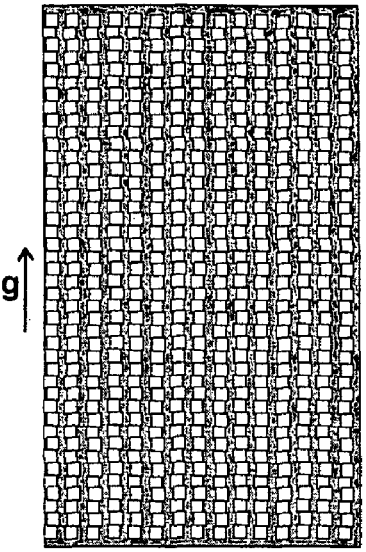
Fig 22a　　　　　　　　　　Fig. 22b
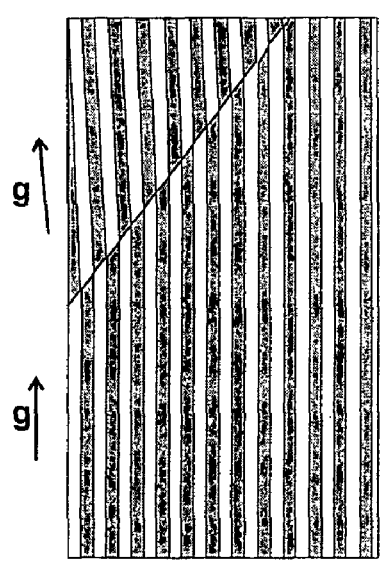
Fig. 22c

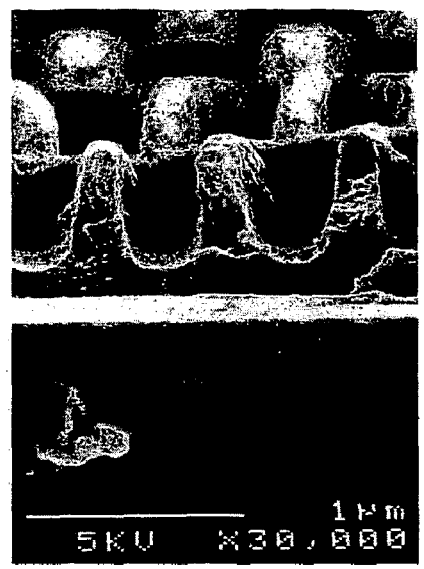
FIGURE 24 - SEM of a positive slip for a 0.6μm grating
Figure 25
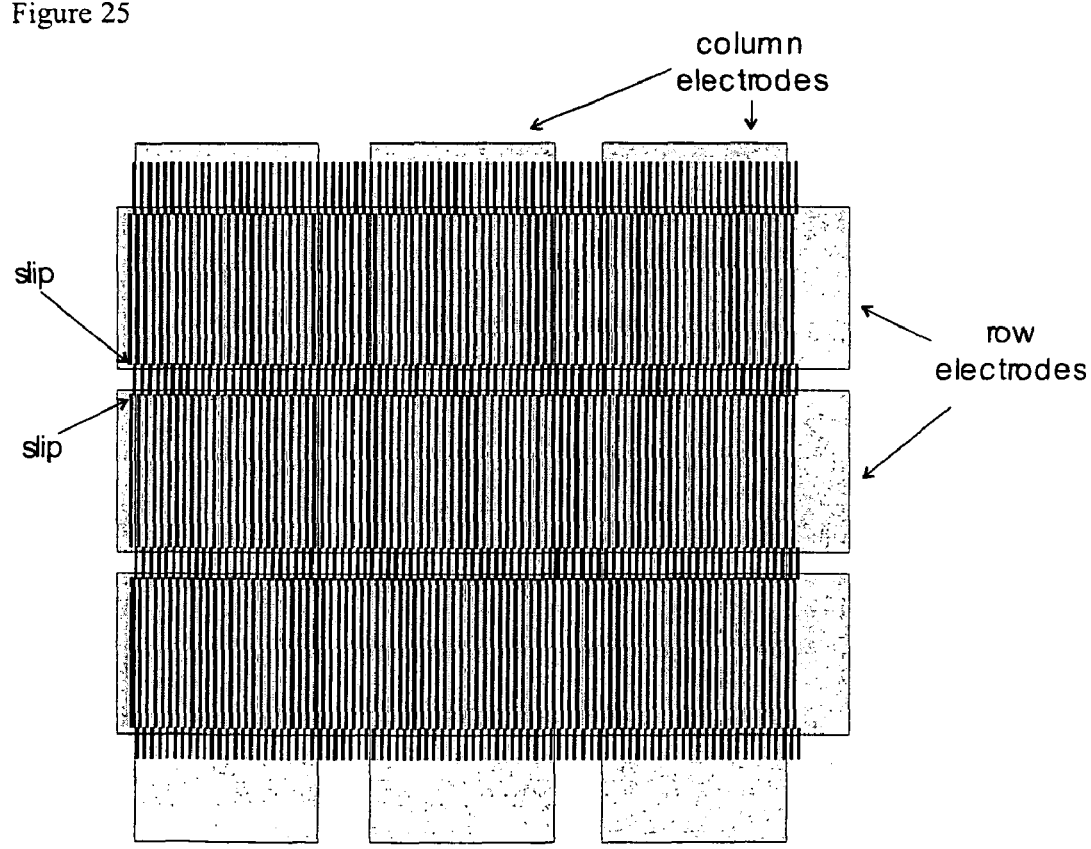

*Pixel A*          *Pixel A +n*

Fig. 28a
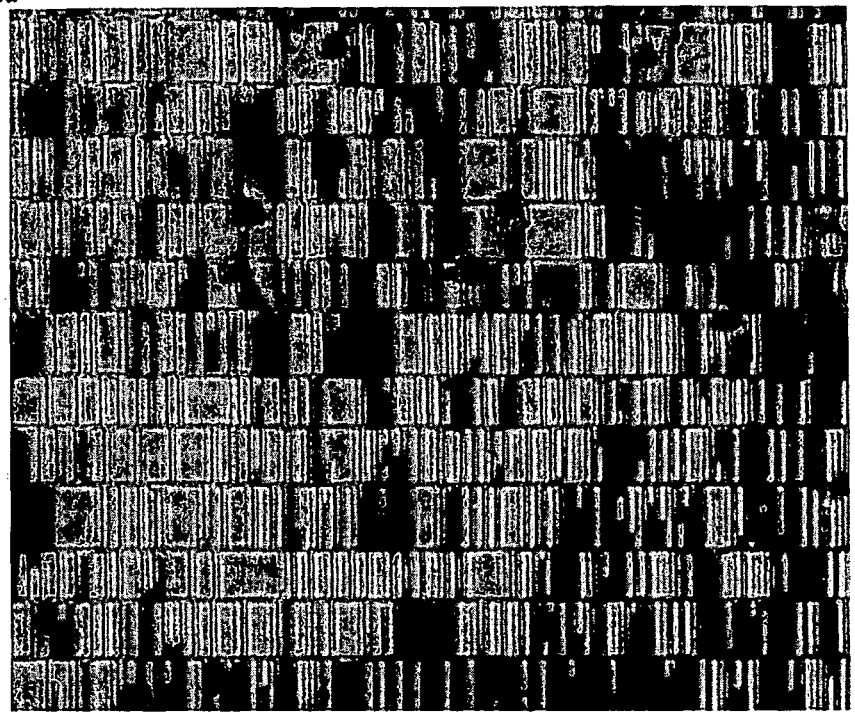
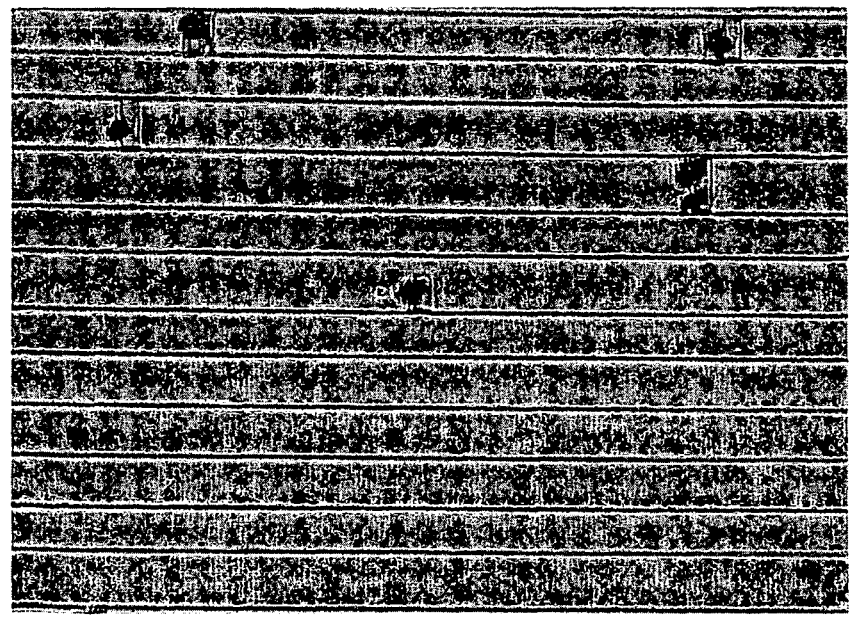
Fig. 28b

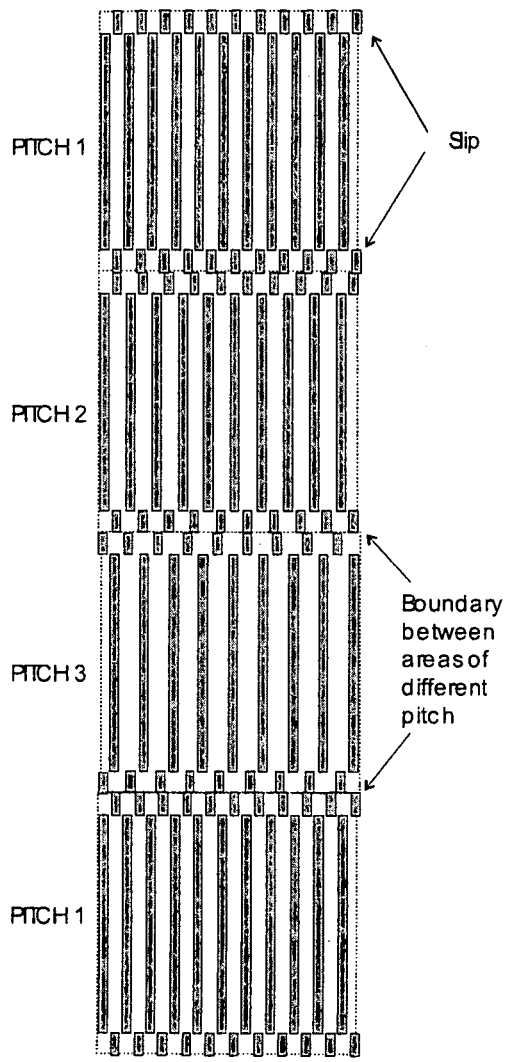
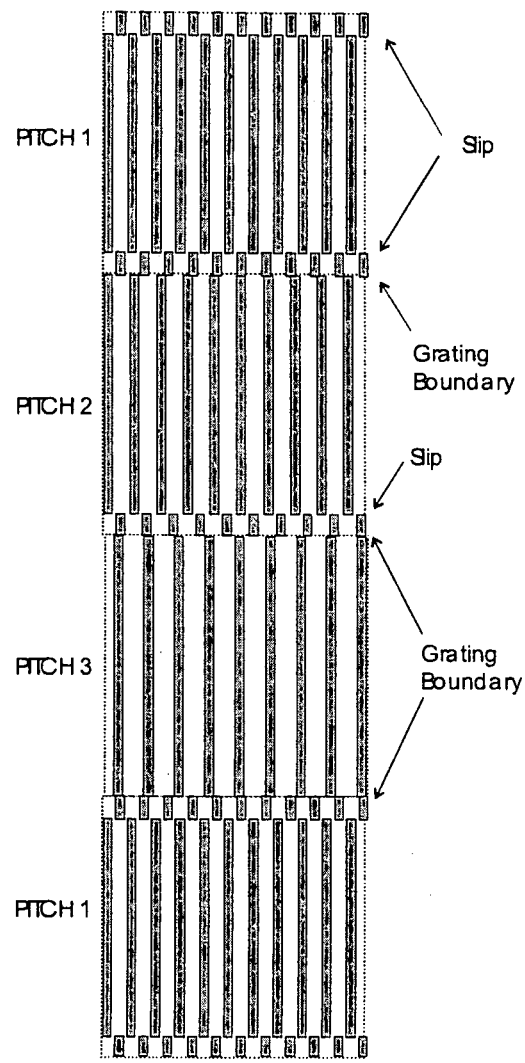
Fig. 32a
Fig. 32b

LIQUID CRYSTAL DEVICE INCLUDING AN ALIGNMENT GRATING WITH BREAKS THEREIN

This application is the US national phase of international application PCT/GB04/000519, filed 9 Feb. 2004, which designated the U.S. and claims priority of EP 03250808.7, filed 7 Feb. 2003 and US Provisional Application No. 60/456,526 filed 24 Mar. 2003, the entire contents of each of which are hereby incorporated by reference.

This invention relates to a liquid crystal device having a regular surface alignment grating stabilising a particular liquid crystal configuration and especially to a multistable device wherein at least one stable state is a Defect state and in particular to such a liquid crystal device wherein the regular surface alignment grating has breaks, or discontinuities, therein.

Bistable or multistable liquid crystal devices are commonly used as displays for displaying information stored in an electronic form. The devices are generally used in a pixelated form and either directly driven, matrix or actively addressed. Other uses for such devices are as light modulators, optical microwave or infrared shutters. The device may use bistability only occasionally or only partially. A typical device includes at least two electrode structures, means for applying appropriate signals and means of discriminating the two states, such as dyes, polarisers, reflectors, absorbers and illumination sources.

U.S. Pat. No. 5,357,358 describes a bistable liquid crystal device wherein both internal surfaces of the cell have a treatment giving rise to various preferred alignment directions of the liquid crystal material adjacent the surface. Careful arrangement of the surface alignment directions on opposing plates can lead to two stable states for the liquid crystal material at different azimuthal angles. U.S. Pat. No. 5,796,459 describes another surface treatment that can be used to give two stable states with different azimuthal orientation of the liquid crystal director.

Zenithally bistable liquid crystal devices are also known. U.S. Pat. No. 6,249,332 describes a liquid crystal device wherein at least one internal surface has a profile which allows the liquid crystal material to be in one of two stable states, a Continuous state or a Defect state, the two states having the same azimuthal orientation of the liquid crystal director but different zenithal orientations.

International Patent Application WO02/08825 describes how the careful design of surface profile can lead to Defect states with the defects forming close to or at predetermined features of the surface to stabilise certain configurations. In this way more than one stable state can be achieved.

WO01/40853 describes another bistable device having a surface designed to give local zenithal bistability. In this device however the profile changes over length scales of less than 15 micrometers. These changes are designed to vary the director orientations within each pixel creating micro-domains that can, for example, give scattering of incident light.

Bistable devices are also known where the combination of two suitable monostable surfaces can lead to bistability, for example as described in U.S. Pat. No. 4,239,345, U.S. Pat. No. 6,327,017 or U.S. Pat. No. 4,333,708.

In general bistable or multistable devices work by ensuring that the energy associated with the liquid crystal configuration is locally minimised at each stable state and that an energy barrier exists between the various stable states. In defect stabilised multistable liquid crystal devices the cell has at least one state where defects have formed. Whilst the defect represents a disclination of the liquid crystal director field and therefore some energy is contained in the distortion, the formation of defects in certain areas can result in the energy being minimised as compared to a different stable configuration without defects present or a configuration having a different arrangement of defects. This minimum may be either the global minimum of the system, or a local minimum separated from other minima by an energy barrier.

In defect stabilised devices where the surface profile provides the stabilisation of the defects the surface relief structure has a profile in one direction that has at least one concave edge and at least one convex edge. These edges act to stabilise the defects or disclinations of strength ±½. The structure is repeated across the surface to give two or more stable or meta-stable states. This is surface multistability, i.e. the stable states are produced regardless of the treatment on the other surface, although obviously the treatment on the other surface would effect the overall configuration. The repetition may be periodic or aperiodic, but with a maximum and minimum separation of the relief structures. Such surfaces are used in U.S. Pat. No. 6,249,332 and WO01/40853. Common to all prior art surface defect stabilised devices is that the at least once concave edge and at least one convex edge is parallel to the plane of the surface.

The energy barrier between the various stable states should be high enough to ensure that the correct state is selected and maintained across a range of operating conditions. It will be noted that in matrix addressed displays one pixel may have a field applied before or after it is actually being addressed to cause correct latching. Correct latching needs to be maintained across a range of operating conditions. Temperature, mechanical stress and field inhomogenities all play a part in the various latching thresholds. Consistency of latching is obviously desirable. However the energy barrier should also be low enough that the states can be selected by application of the appropriate fields. Multistable devices are often used with portable, battery driven appliances where power consumption is an issue and minimal voltage or power to latch would be advantageous.

Further it will be appreciated that the liquid crystal material is generally a continuous layer but may be divided into pixels which are separately addressable. Thus neighbouring pixels, or the liquid crystal material in the inter-pixel gap, may be latched into different stable states. The liquid crystal material at the interface is therefore subject to the elastic forces from the adjacent material which may cause partial "grow-back" or creep of the wrong, i.e. undesired, state. Some devices even have different domains within a pixel, i.e. sub-pixels having a different surface profile to other sub-pixels, to allow for latching at different thresholds to give greyscale. Again the problem of grow-back may be encountered.

Even when a device is intended to be monostable in operation it may require a particular liquid crystal stable configuration to function correctly. Change to the operating conditions could result in a change of the relative energies of states leading to growth of an unwanted state and incorrect operation.

It is therefore an object of the present invention to provide an improved multistable surface treatment for a liquid crystal device and to provide an improved multistable liquid crystal device.

Thus according to the present invention there is provided a liquid crystal device comprising a layer of liquid crystal material disposed between two cell walls, at least one region on the internal surface of at least one cell wall comprising a surface alignment grating having a single groove direction characterised in that the surface alignment grating comprises a plurality of breaks along the groove direction.

The surface alignment grating comprises a series of grooves, the profile of which is sufficient to cause the liquid crystal material adjacent the grating to adopt a particular stable surface configuration. In some embodiments the surface alignment grating may comprise a multistable surface alignment grating the profile of which is sufficient to cause the liquid crystal material adjacent the grating to adopt two or more stable configurations, one of which will be a Defect state. In any case the grating may be periodic, in that a certain profile variation is repeated across the region, or aperiodic in that the surface profile has an irregular variation. The grating has substantially a single groove direction however in that the direction of all the grooves in the region is substantially parallel. The groove direction is the direction in which the groove extends. In a prior art multistable device using a grating structure without breaks, such as described in U.S. Pat. No. 6,249,332, it can be seen that the surface profile varies across the cell wall in a plane orthogonal to the groove direction but is constant in a plane which is parallel to both the groove direction and the normal to the cell wall.

As described in U.S. Pat. No. 6,249,332 and in WO02/08825 the effect of the surface profile is to allow at least one stable liquid crystal Defect state in which the formation of ±½ defects stabilise the liquid crystal material. Another stable state is the Continuous state where no defects are present. By careful design of the surface profile the energy associated with each state can be a local minimum with an energy barrier associated with moving from one stable state to another. Therefore the liquid crystal material can adopt any of the stable states and can be latched between the various states on supply of an appropriate impetus, usually an electric field pulse of correct polarity.

As described in WO02/08825 the sites where defects form in the Defect state are determined by the surface profile. In the plane orthogonal to the groove direction the presence of concave and convex surface curvature favours the formation of defects in the vicinity. Usually, this surface curvature leads to concave and convex edges. The energy of the system is therefore a local minimum when defects are formed and so located. This acts to keep the defects pinned in the plane orthogonal to the groove direction. Along the groove direction defect lines extend in the vicinity of the edges.

As explained above the devices are formed as a plurality of pixels which can be separately addressed. There may even be sub-pixel areas within a single addressable area with different latching characteristics to allow for greyscale. Therefore the situation will arise where the liquid crystal device is in a Defect state in one area that is adjacent an area in the Continuous state. Therefore there will be a short transition region where the liquid crystal material goes from a Defect state to the Continuous state. In this region the position of the defects, i.e. the +½ and −½ defect pair, relative to the concave and convex edges gradually alters across the transition region in the groove direction, the defects approaching one another as one gets closer to the region of Continuous state, until the defects meet and annihilate at an annihilation point. Each +½ and −½ defect pair may form a defect loop, separated by at least two annihilation points.

In the transition region the elastic forces of the adjacent liquid crystal material acts upon the material in the transition region. The bulk material in the Defect state tends to act upon the material in the transition region to induce it to adopt the Defect state whereas the material in the Continuous state tends to act to form the Continuous state. In the absence of an addressing field the relative energies of the two states will in large part determine what happens in the transition region. In the prior art there is no pinning of the annihilation point in the groove direction. Therefore if one state is more energetically favourable than the other it can have a greater effect on the transition region and start to grow into the other state. This effect, known as grow-back, can therefore lead to the pixel or sub-pixel assuming the incorrect or undesired state. Even where the two states are energetically equal mechanical disturbance, or temperature change could change the relative energies of the two states, thereby disrupting the equilibrium and start grow-back. Alternatively, the shape of the grating may vary. This variation may be deliberate or may be accidental due to uncertainties in the process conditions. Such variation may cause one state to be favoured over another, thereby allowing unimpeded grow-back into this state in situations where it is undesirable.

The discussion above has concentrated on multistable surface alignments. However certain liquid crystal devices are intended for monostable operation, i.e. they should always relax to a desired state when not being addressed, but require a particular liquid crystal alignment for the correct optical properties. As mentioned above however mechanical disturbance or change in temperature may alter the relative energies of certain configurations and another, undesired, state may start to become more energetically favourable. Further as mentioned, process variations in manufacture of the grating may mean that the grating properties vary slightly across the device. Therefore grow-back could be an issue even in some circumstances even in monostable devices Further, for both monostable and multistable devices, the nature of the liquid crystal material means that there will be free ions in the liquid crystal material. Where the liquid crystal material is addressed by an electric field of a particular polarity application of the field will tend to cause migration of the ions. When the addressing field is removed however the concentration of positive ions towards one surface and negative ions toward the other will create a temporary field of the opposite polarity until equilibrium is reached again. This ionic field, being of the opposite polarity to the addressing field, will act upon the liquid crystal material in such a way as to promote to latching to the incorrect state. This is a well-known effect in liquid crystal devices and the device is designed such that the latching characteristic are such that the reverse ionic field is insufficient to cause latching. However the presence of the field can disrupt the equilibrium between states at a transition region so as to start a grow-back process.

Due to the nature of the surface alignment grating in most prior art devices, for example surface roughness, there will be a certain degree of natural pinning of the annihilation point, and therefore resistance to grow-back, due to the physical characteristics of the materials of the surface but this will tend to be weak and easily overcome. Therefore the prior art devices are susceptible to the undesired state growing from one pixel or sub-pixel (or the inter-pixel gap) to another pixel or sub-pixel.

Note that in some terminology the term pixel can mean more than one separately addressable area. For instance a 64 by 64 pixel colour display may actually have three separate addressable areas in what may be termed a pixel, each being a different colour. Similarly, a pixel may also be sub-divided into separately addressable areas to create greyscale. However for the purposes of this specification the term pixel shall mean an area of the device which is separately addressable.

The present invention therefore deliberately introduces breaks into the grating in the groove direction. The term break means a discontinuity in the grating in the groove direction located between two groove sections, i.e. a break in the smooth nature of the grating in the groove direction. Conveniently, the groove direction will remain in substantially the same direction either side of the break. The break may have no physical dimension in the direction parallel to the groove direction, or it may have a finite width. The width of the break in the groove direction will be limited to 5 µm, preferably less than 1 µm and most preferably less than 0.25 µm. As will be explained in more detail the breaks may comprise protrusions in the troughs of the groove or gaps in the peaks or both. Additionally or alternatively the breaks could comprise a slip or displacement of the groove with components in a direction perpendicular to the groove direction. For example, the slip may occur in the plane normal to the groove direction and parallel to the plane of the cell. Other slip planes exist, including vertical slips, or planes that are not normal to the groove direction.

The breaks therefore effectively divide the grating into a number of groove segments and a break is something located between two groove segments having a single common groove direction. Each groove segment will have a surface profile that is constant along the groove direction but which varies along a direction perpendicular thereto. However at the break at least part of the surface profile will vary along the groove direction resulting in concave and/or convex edges in a plane containing the cell normal and the groove direction. The breaks effectively create an energy barrier to be overcome in moving any defects away therefrom creating a degree of pinning of the defects. This energy barrier means that the defects are not free to move in the groove direction which can prevent grow-back of an incorrect state. Although grow-back can occur along a groove segment the presence of a break will tend to pin the defects and therefore the annihilation point in the vicinity of the break. Therefore grow-back will not progress beyond the break.

Further the breaks, being areas which energetically favour the formation of defects, tend to act as nucleation sites for the formation of defects. This can lead to lower voltages being required for latching as will be explained in more detail later. There are also advantages in terms of operating window. With breaks acting as reliable nucleation sites the liquid crystal device has a more reliable and controllable response at a range of operating temperatures. It also allows a greater choice in the design of surface profile leading to multistability.

Generally the breaks separate grating segments wherein the grating segments have substantially the same surface profile on either side of the break in the groove direction. In other words the break is a discontinuity in what would otherwise be a continuous uninterrupted groove extending in the groove direction. The skilled person will appreciate though that inaccuracies in manufacturing processes may mean that there are small differences in the shape on either side of the break. Also with slips or displacements the alignment of the grating segments is obviously out of phase. What is intended however is that the grating either side of the break is intended to give the same states with the same latching characteristics.

Breaks may also be formed from changes of shape to the grating that occur suddenly at a dislocation plane. For example, such breaks may involve a change of the mark-to-space ratio of the grating groove to ridge, or a change in shape from sawtooth to trapezoidal gratings.

It should be noted that if the pitch of the grating were to vary across a slip break the difference in pitches will result in that in some areas a groove on one side of a break line will encounter a trough on the other side but further along the break line the grooves may align so as to effectively result in no break. However a change in the mark to space ration, i.e. ratio of width of peak to trough, will not necessarily alter the pitch and a line of breaks across a grating could be achieved.

Also it is noted that if the grating shape changes across a break the two areas could have different latching characteristic which could potentially mean that such a break does not prevent grow-back. The presence of such breaks could still aid in formation of certain states however and where the latching characteristic are the same but different Defect states are formed this may not cause a problem.

Preferably the width of the break in the groove direction is less than less than 0.5 µm or preferably less than 0.25 µm. As will be described the area of the break between the groove segments may not have the right alignment conditions and therefore the liquid crystal material in this area may be in the incorrect state. Therefore in order to minimise the possible optical effects the width of the break may be minimised.

Conveniently the breaks comprise surface features having a profile in a plane containing the grating normal and the groove direction which has at least one concave and at least one convex edge.

The grating normal is the normal to the grating as a whole, not the normal to the locally varying surface. As mentioned in the plane containing the grating normal and the groove direction the profile of the prior art surface alignment gratings is constant. The breaks however introduce concave and convex edges in this plane. These concave and convex edges act to pin defects in the vicinity thereof and thus provide pinning of the defect lines in the groove direction. The introduction of such features therefore introduces corners into the surface profile.

Preferably the radius of curvature of the at least one convex or at least one concave edge is less than 2 µm, preferably less than 1 µm and often less than 0.4 µm. Generally the smaller the radius of curvature the greater the pinning effect of the edges.

Conveniently the at least one convex and at least one concave edge are joined by a surface, at least part of which is substantially parallel to the grating normal.

One convenient form of break comprises an area where the profile of a groove trough is raised. Raising the contour of a groove trough provides a change in profile in the groove direction in the trough. This can act to pin defects at the edges of the raised area. Conveniently the raised area or protrusion is at the same level as the peak. In other words at the break the profile in the groove direction rises from the groove trough to the same level as the peak then drops back down to the level of the trough. In the orthogonal direction the profile will actually stay level across the break from the peak of the groove. Of course the next groove along may or may not have a break at the same place and so a break between two groove segments for one groove may be adjacent a continuous part of another groove segment, or even a continuous groove. It should be noted here that the raised area here represents a discontinuity in the profile in the groove direction in the trough but the profile in the groove direction across the peak is continuous. Thus, taking a groove to comprise a peak and a trough, a break in the grating can be a discontinuity in either or both of the peak or trough.

As mentioned such breaks, which may be termed necks, will tend to pin defects in the groove direction along the edges of the rise on either side of the neck. Where a Defect state is on one side of the neck and Continuous state on the other the defects present in the defect line will be guided by the raised area to an annihilation point which will be pinned. The breaks therefore act to pin the defect loop formed by the lines of defect running through the liquid crystal material, either at or close to the surface. This will happen even when the liquid crystal material is in Defect state on both sides of the neck, i.e. on each side the defects will be guided to an annihilation point. This means that the liquid crystal material adjacent the area at the top of the rise will be in the continuous state. Hence the presence of breaks of this nature will inherently mean that there may always be a slight amount of Continuous state present in a Defect state which will reduce contrast slightly. Therefore it may be advantageous to minimise the area of the top of the rise, or neck.

Additionally or alternatively the breaks may comprise areas where the profile of a groove peak is lowered, preferably to the level of the groove trough. The breaks effectively comprise gaps in the peaks. The edges formed where the peak of one groove segment ends again act to pin defect loops in the defect state, in a similar manner described above with regard to necks. Again therefore the area of the gap will always be in the continuous state. It should be observed that the preceding description is the case for a homeotropic surface condition. If the liquid crystal aligns in a planar direction with at least a component perpendicular to the groove direction, then the Defect state and Continuous state conditions are reversed. For example, in such a planar aligned device, a gap may lead to a small island of pinned Defect state.

A further type of break comprises areas where the grooves, or groove segments, on either side of a break are displaced relative to each other in a direction having a component perpendicular to the groove direction. In other words the break is an area where the groove undergoes a slip. One can think of this type of break being formed by taking a continuous grating and dividing it in two along a line which is not parallel to the groove direction. One part of the divided grating is then displaced slightly relative to the other. This will create the situation where the peak of the groove of one grating segment does not align with the peak of the next groove segment. This will inherently create a discontinuity in the groove direction at the interface. Of course the actual grating is not necessarily produced in this fashion. Methods for forming grating structures are well known in the art, for instance photolithography using appropriate masks. A mask could readily be designed with slips in the grating and used when exposing a photoresist material.

Conveniently the two groove segments are displaced relative to each other in a direction which is substantially perpendicular to the groove direction although other directions are possible provided that the direction has a component perpendicular to the groove direction.

This type of break will, as mentioned, create a discontinuity in the profile in the groove direction at the interface between groove segments. Depending upon the degree of relative displacement this discontinuity can pin the defects present in the defect state in various ways. Take the simple situation where the grating is periodic and the repeat unit consists simply of a peak and a trough of roughly equal width. If the degree of relative displacement is half the period of the repeat unit then at the interface the groove peak of one groove segment will be adjacent the groove trough of the other and vice versa for the trough. The sharp break in continuity will lead to defects being pinned along the exposed edges in a similar fashion as for necks and gaps. If the liquid crystal material is in the Defect state on both sides of the interface the break will still lead to annihilation points for the defect loops on each side of the interface. However the two separate annihilation points are not appreciably spaced from one another in the groove direction. Therefore there will be minimal chance for any material to form into the continuous state between the two annihilation points and thus the optical properties may be improved as compared to gaps or necks. In actuality the slip itself may have some degree of width in the groove direction so there may be a very small area of unavoidable continuous state, but this can be minimal.

Another displacement could be, say, quarter of the repeat period. Again taking the simple case of repeating peak and trough of roughly equal width the peak of one groove segment overlaps with the peak of the other. The same is true for the troughs. With this arrangement in the case of Defect state on both sides of the interface the defect lines may not actually come together and annihilate. Instead the defect lines might follow the edges of the overlap smoothly into the area on the other side of the interface. This then would mean that no Continuous state was present when not required. However the edges of the overlap would still act as pinning sites for the defect loop when the other side of the interface was latched into Continuous state.

As grow-back of an undesired state will occur in a pixel or sub-pixel along the groove direction it is preferable that the majority of grooves within a pixel or sub pixel are arranged to have at least one break therein. In other words it is preferred that the device is arranged such that a minority of the grating within any pixel or sub-pixel comprises grooves not having a break within the area of the pixel or sub-pixel. Preferably less than 25%, more preferably less than 10% of the area of the pixel or sub-pixel comprises grooves not having a break therein. Indeed it may be beneficial to ensure that there are no areas within a pixel or sub-pixel where a groove runs from one side of the pixel to the other without a break.

It may be convenient to ensure that at any given point within the pixel or sub-pixel more than one break is encountered in a groove direction. In other words as one traverses a pixel or sub pixel along the groove direction at any point one encounters at least two breaks separating various groove segments. Theoretically grow-back could occur from both sides of a pixel or sub-pixel and with only one break the wrong state could therefore be achieved on both sides of the break and hence the whole of the latchable area of the pixel or sub-pixel. Having more than one break prevents this from happening. Numerous breaks are especially useful where the device is to be used in a partial latching mode. Partial latching occurs when a voltage is applied to the device, which is insufficient to cause fill latching of a sub-pixel, but instead creates, within that sub-pixel, domains of liquid crystal material in one state with the rest of the material being in another state or states. Partial latching is useful for achieving greyscale as is well known. Having numerous breaks in the sub-pixel along the groove direction will aid the regular formation of partial latching domains by acting as nucleation sites as discussed above. However once the domains are formed the numerous breaks will prevent unwanted growth or shrinkage of the domains.

For some embodiments the breaks along the groove direction will be separated by at least double the groove pitch, i.e. each groove segment will have a length equal to at least double the groove pitch. As mentioned the liquid crystal material in the vicinity of the breaks will experience additional elastic forces compared to material located away from the breaks. If the groove segments are too short these end forces may affect the bulk states adopted by the liquid crystal material giving incorrect alignment. A separation of breaks in the groove direction of more than 3 µm could be useful.

Conveniently the multistable surface alignment grating is a zenithal bistable surface alignment grating such as described in U.S. Pat. No. 6,249,332 or WO02/08825. Alternatively, as described the surface could provide monostable alignment to the liquid crystal in which a grating is used to create a Defect state for advantageous properties other than multistability.

For a monostable device it is important to minimise the radius of curvature of the edges that form the grating grooves, since this makes the desired state more stable. However, in practice, the radius of curvature is limited by manufacturing process, and may be limited to 0.1 µm or greater. In such instances, it is important to introduce breaks into the surface to prevent unwanted formation of a Continuous state, or a Defect state with the incorrect director orientation. For a multistable liquid crystal device, it is important that the radius of curvature of the edges is within the range suitable for formation of either Defect or Continuous states.

In general the invention relates to an improved surface alignment grating for inducing an adjacent liquid crystal material to form at least one stable state in which defects are formed close to the surface grating. Therefore in another aspect of the invention there is provided a surface alignment grating for a liquid crystal material comprising a grating having a single groove direction characterised in that the grating has a plurality of breaks along the groove direction.

In a preferred embodiment the invention relates to a multistable liquid crystal device comprising a layer of liquid crystal material disposed between two cell walls, at least one region on the internal surface of at least one cell wall comprising a multistable surface alignment grating having a single groove direction characterised in that the surface alignment grating comprises a plurality of breaks along the groove direction and in that the grating profiles on either side of the break in the groove direction are substantially the same.

The invention will now be described by way of example only with reference to the following drawings of which;

FIGS. 1a and 2b show two stable configurations for liquid crystal material at a convex surface having homeotropic alignment, FIGS. 2a and 2b show two stable configurations for liquid crystal material at a concave surface having homeotropic alignment, FIG. 3 shows a surface relief structure giving rise to two stable states, a) a Continuous state and b) and Defect state, FIGS. 4a-4c show plan views of three types of surface alignment gratings used in the prior art, FIG. 5 shows a schematic of an energy diagram for the Defect and Continuous states for a surface such as shown in FIG. 3, FIG. 6 is a schematic of a prior art zenithal bistable device and illustrates latching between stable states, FIG. 7 illustrates the defect lines present in a prior art grating in a transition from a Defect state (front) to a Continuous state (rear), FIG. 8a shows a grating having negative breaks, FIG. 8b shows a grating having positive breaks, FIG. 8c shows a grating having a slip, FIG. 8d shows a grating having a slip of half the grating period, FIG. 8e shows a grating with a repeating slip pattern, FIG. 8f shows a grating having two slips in close proximity, FIG. 8g shows a grating having a positive break combined with a slip, FIG. 8h shows a grating having a partial slip, FIG. 8i shows a grating having a change to mark-to-space ratio across a dislocation line, FIG. 8j shows a grating having a non parallel slip, FIG. 8k shows a grating having an angles slip plane, FIG. 9 shows a schematic of part of a grating shown in FIG. 8b, the break comprising a gap in the groove peak, and illustrates the defect lines present in a transition from the Defect state (front) to the Continuous state (rear), FIG. 10 shows a schematic of part of a grating shown in FIG. 8a, the break comprising a neck in the groove trough, and illustrates the defect lines present in a transition from the Defect state (front) to the Continuous state (rear), FIG. 11 shows an SEM photomicrograph of a grating with necks such as illustrated in FIGS. 8a and 10, FIG. 12 shows a schematic of a grating having a tapered gap in the groove peak and illustrates the defect lines in a transition region from the Defect state (front) to the Continuous state (rear), FIGS. 13a and 13b show a magnified photograph of a grating having necks, such as illustrated in FIGS. 8a, 10 and 11, FIG. 13a shows the pixel immediately latching to a partially latched state and FIG. 13b shows the same pixel 60 seconds later, FIGS. 14a-14c show magnified photographs of the interface between two pixels, the top pixel having gaps in the grating and the bottom pixel having no breaks, at various times after addressing; a) immediately after latching, b) two seconds later, c) ten seconds after latching, FIGS. 15a and 15b show the effect on a) latch threshold and b) the partial latch width with increasing gap size, FIGS. 16a and 16b show the effect on a) latch threshold and b) the partial latch width with increasing distance between gaps, FIG. 17 shows a schematic representation of a slip break such as shown in FIG. 8d and illustrates the defects lines in a transition from Defect state (front) to Continuous state (rear), FIG. 18a shows the defects following the vertical edges of the slip, FIG. 18b shows the defects following the top and bottom surfaces, FIGS. 19a-19f show a series of photographs at different times of a test pixel with breaks (left) compared to a control pixel with no breaks (right), FIG. 20 shows a photograph of a device made up of a repeated pattern of three areas of different pitch, the interface between the areas of different pitch acting as slips, FIG. 21 shows the design of a mask suitable for creating a liquid crystal surface alignment profile having three sub-pixels of different pitch, each sub-pixel having a plurality of breaks in the form of slips, FIGS. 22a-22c show further examples of surface alignment gratings according to the present invention, FIGS. 23a and 23b show SEM images of negative slips, i.e. slips combined with gaps, FIG. 24 shows an SEM image of a grating with positive slips, FIG. 25 shows an arrangement wherein slips are arranged to be close to pixel edges, FIG. 26 illustrates the interpixel gap and the potential error caused by growback from the inter-pixel gap, FIG. 27 shows examples of the appearance of adjacent pixels and the inter-pixel gap in various arrangements, FIGS. 28a and 28b show an optical photomicrograph of a display having slips according to the present invention a) partially latched and b) fully latched, FIG. 29 shows the visual effects of 4 µm spaced slips as a function of slip separation and percentage of chrome in the mask, i.e. the mark to space ratio of the mask, FIGS. 30a-30 show various mask designs for producing slips having a mark to space ratio is less than 50%; a) a slip with no interleave and a phase shift of 180°, b) a phase shift of less than 180° and c) a negative interleave combined with a 186° phase shift, FIGS. 31a and 31b show SEM photomicrographs of two grating structures according to the present invention formed using the same mask, FIGS. 32a and 32b show different grating designs for use in a bistable grating aligned device with greyscale, and FIG. 33 shows a grating design for use with three areas of different threshold and the possible pixel patterns that could result.

Defect stabilised multistable liquid crystal devices are known. US Pat. No. 6,249,332 describes such a device where the surface profile of at least one of the cell walls leads to zenithal bistability. A repeating surface profile is used which has a varying contour in one direction defining concave and convex edges.

FIGS. 1a and 1b show side elevations for two possible director configurations of liquid crystal material at a convex surface with an internal angle of about 120° and a local homeotropic normal boundary condition of the liquid crystal director. The short continuous lines represent the local orientation of the director. A dotted line is shown normal to the director, which is included as a guide to the eye, but is also representative of the director configuration where the surface has a planar condition. In FIG. 1a, a +½ strength defect (or disclination) occurs at the apex of the surface, whereas the director is continuous in the FIG. 1b. FIGS. 2a and 2b show the similar situation for a concave homeotropic surface with an external angle of 120°. Again, there are two possible configurations: Defect (D, FIG. 2a) or Continuous (C, FIG. 2b). In this case the defect has strength −½ if the director is oriented normal to the surface, i.e. homeotropic alignment. The polarities of the defect are reversed if the surface has a planar condition, with the +½ for the concave surface and −½ for the convex.

The energy of the each state is related to the elastic energy of the distortion, which in turn is related to the curvature and the local anchoring energy of the surface in addition to the elastic properties of the liquid crystal materials. There is an additional contribution to the energy of the Defect states associated with the change in order parameter of the liquid crystal material at the defect core. If there is no curvature of the surface (with uniform anchoring), the lowest energy configuration will be a uniform state free from defects. Without pinning sites on the surface, there is effectively an attractive force between oppositely charged defects will cause them to move towards each other and annihilate. In practice, every surface has a degree of roughness, which might provide some random pinning of the defects to prevent this annihilation. However, typical surfaces used to align liquid crystals in devices (including spin-coated polymers and photo-polymers used for grating alignment) are relatively smooth and such pinning may be weak. The occurrence of disclinations on cooling into a nematic phase from the isotropic liquid will usually disappear a few degrees from the transition when the sample is contained by flat surfaces with such coatings.

FIG. 3 shows an example of a surface profile used in U.S. Pat. No. 6,249,332. The surface profile comprises a series of grooves formed by a repeating surface profile. FIG. 3 shows the cross section of the profile in the plane orthogonal to the groove direction. The combination of at least one concave surface (the groove trough) 2 and at least one convex grating surface (the groove ridge or peak) 4 then gives two or more bistable states in which the liquid crystal orientation is different and uniform. In the example shown in FIG. 3, the ±½ defects stabilise one tilt of the director, and the Continuous state stabilises a second tilt. In both cases, the tilt is uniform in a plane parallel to the surface (represented by the dotted line S-S' in FIG. 3) in close vicinity to the plane of the grating (usually within a distance less than or equal to the grating pitch). For a homeotropic boundary condition the Defect state has a low tilt and the Continuous state has a high tilt, often close to 90°. If the surface has a planar condition (in the plane perpendicular to the grating), the Defect state has high tilt and the continuous state low tilt.

Other grating designs are described in WO02/08825, wherein the grating has three or more defect sites, such as two convex and one concave edges, two concave and one convex or two concave and two convex. In such instances, multiple states can exist corresponding to the defect pairs having different relative positions, leading to different optical configurations and greyscale.

In each of these cases the grating is continuous in a direction normal to the zenithal plane containing the director. A representative plan view of a typical grating used in the prior art is shown in FIG. 4a where the shaded area represents groove troughs and the light areas represent groove peaks. Typical pitch p is in the range 0.1 µm to 5 µm, preferably in the range 0.4 µm to 1.4 µm, or 0.6 µm to 1.1 µm. The groove direction (represented by the unit vector g) may be constant within each pixel of the device, or may vary within the pixel. However, the groove direction g will be constant over length scales of below 15 microns for the majority of a pixel. The grating can be further characterised using the mark to space ratio (c/p) and degree of asymmetry, which in turn influences the curvature of the leading and trailing edges of the surface profile. In the Defect state, the ±½ defects are formed as lines (ignoring the thickness of the defect core as a realistic representation) parallel to the groove direction g. The liquid crystal director has a component perpendicular to g but no component parallel to g. In the Continuous state, the director will have a different component perpendicular to g, but again will have no component parallel to g.

Included in the device described in WO01/40853 are changes of the groove direction g over length scales of less than 15 microns. These are designed to vary the director orientations within each pixel, creating micro-domains or pixel areas that can, for example, give scattering of incident light. Examples are the bi-directional grid shown in FIG. 4b and the bi-grating of FIG. 4c. Both examples give a locally varying direction to the orientation of the director in the Defect state in the plane parallel to the surfaces. The aim is to lead to a structure that has components of the in-plane director component of the low tilt state in mutually perpendicular directions. For example, this may then lead to an optical configuration that causes substantially more scattering when in the Defect state than in the Continuous state.

The energy levels for the two states are represented schematically in FIG. 5. The energy barrier 6 between the states is related to the energy associated with annihilating and creating defects. The surface may be readily designed to give either symmetric (dotted line) or asymmetric (continuous line) latching characteristics. Both cases are bistable, where the energy barriers $U_D$ and $U_C$ are sufficiently high, even if they are not symmetrical. If the barriers are low, then external disturbances may cause unwanted transition from one state to the other. For example, with a positive dielectric anisotropy material, the applied fields used whilst multiplexing the other lines of a device will tend to stabilise the Continuous state. If $U_C$ is low, grow-back of the Continuous state will then occur. Alternatively, at high temperatures, the liquid crystal order parameter S is low so the energy of the Defect state becomes lower. If the surface is designed to give Continuous state stability at ambient temperatures, then at some elevated temperature the energies become symmetric and eventually give a mono-stable Defect state close to the clearing point. Reverse ionic fields, built up by the migration of free ions during addressing, will also play a part.

An example of a practical device configuration is shown in FIG. 6. The multistable surface relief structure 10 is used opposite a flat monostable homeotropic surface 12 to give either a vertically aligned or a hybrid aligned nematic. When the sample is placed between crossed polarisers, arranged at an angle to the grating, the change in optical retardation leads to a difference in transmission or reflection. Latching between the states may be done using electrical pulses of appropriate polarity, 14. It is customary to use bipolar pulses to maintain DC balance, wherein it is the polarity of the trailing pulse that determines the state.

There are different mechanisms for latching between the states. The elastic distortion in the Defect and Continuous states results in a flexo-electric polarisation for polar liquid crystals with certain molecular shape anisotropies. Moreover, the core of the defect represents a locally "melted" nematic liquid crystal, where the order parameter is effectively zero. The gradient of order parameter in the vicinity of the defect core also leads to a polarisation (the so called ordo-electricity). The symmetry of the $\pm\frac{1}{2}$ defects means that the defect has a net polarisation, resulting either from the local flexo-electricity, the ordo-electricity or their combined effect. Other mechanisms for a polar response may be provided, including the effect of breaking n to −n symmetry at the surface, and the effect of ionic impurities. The cumulative effect is a surface polarisation $P_s$ at the grating surface which couples to the applied DC field to induce latching. It should be noted that the device also has a bulk flexo-electricity in one of the states (the Hybrid aligned state), but the effect of this is very weak, and in practice may be screened by the mobile ionic impurities in the bulk of the liquid crystal.

FIG. 7 is a 3D schematic of the grating surface at the boundary between the Defect state, towards the front of the figure as shown, and Continuous state towards the rear. Dotted lines represent convex surface curvature and dashed lines represent concave. In the defect D state (front), $+\frac{1}{2}$ disclinations 20 occur close to a convex surface, and $-\frac{1}{2}$ disclinations 22 occur close to a concave surface. The disclinations occur along the surface giving rise to defect lines. Where an area of Defect state is adjacent an area of Continuous state however there must be a point where the Defects are removed. "A" represents the point of annihilation for the two disclinations, behind which the state is continuous C. Without any deliberate form of pinning, the annihilation point may traverse freely across the surface 26 to reduce the total energy of the system. If the surface is without any pinning this may lead to unwanted formation of one state instead of the other (D in C or C in D) as the Defect lines (or Defect loop as it may be termed) shrinks or grows. If the two states have equal energy then the desired state will be maintained. However, if some external influence acts to disturb the pixel, whether it is mechanically induced flow, or a transient electric field associated with the multiplex addressing signals applied to the device or a reverse ionic induced field, then the undesired state may result. Moreover, the properties of the system that determine the relative energies of the alignment states may vary, for example due to changes of the ambient temperature. The elastic constants, order parameter of the liquid crystal and the surface anchoring energy decrease with increasing temperature, and can cause the relative energies of the bistable states to change. Thus, a surface designed to give appropriate energies for the D and C states under normal operating temperatures may become monostable at elevated temperatures (usually to the D state). In practice, of course the surface used to form the grating will have microscopic roughness that have sufficient pinning strength that they prevent grow-back of the unwanted state in practical devices. Note, the grating shape used in this example is trapezoidal: each part of the grating repeat pattern has two convex and two concave edges. The defect might occur either at the obtuse convex and concave edges as shown in the figure, or on the more acute edges of the grating surface (i.e at the top and bottom of the vertical edge rather than the sloping edge).

The basis of the invention is to create dislocations or breaks to the surface treatment used to align liquid crystals in order to create sites which pin the defect lines in the groove direction. These breaks may be regularly, randomly or pseudo-randomly spaced across the grating. Examples of such breaks are shown in FIG. 8, although this set of examples is not exclusive. In each case, the grating has substantially a single groove direction and any changes to the alignment of the director in either state are kept relatively small. Preferably, each break should include a concave or convex edge to the surface profile that has a component perpendicular to the plane of the device. That is, the break introduces an edge that runs at least partially from the concave and convex edges of the surface profile of the repeat unit that forms the alignment grating. The breaks effectively introduce corners into the surface profile.

FIG. 8a shows a grating having what may be termed negative breaks or gaps. The grating is a series of grooves each having a ridge, unshaded areas 30 and a trough, shaded areas 32. At certain points the ridges have a gap 34 therein. The gap then forms a break or discontinuity in the profile of the ridge in the groove direction. Defects will then be pinned at the edges of the gaps as will be described. As can be seen the gaps do not have to be aligned so that a gap in one ridge is adjacent another gap.

FIG. 8b shows a similar type of break but where the ridges are linked by necks 36 in the troughs. Again, this positive break introduces defect pinning sites at the interface of the necks and the troughs.

FIG. 8c shows an example of a slip in the grating. This can be thought of as a displacement of the top part of the grating relative to the bottom part or a dislocation of the grating phase. In this instance there is a small displacement, s, which means that the exposed edges 38 of the ridges will act to pin the defect lines present in the Defect state. FIG. 8d shows a larger slip where the peak or ridge of the grating meets the trough of the displaced part of the grating. Note the terms slip and displacement are used only to give an indication of the type of break. No actual movement of the grating is necessarily implied, as the skilled person is aware there are various methods for forming an alignment grating such as using photoresist materials and a grating with this pattern could be formed using a suitable mask. Note, the dislocation may occur suddenly, or over a small distance parallel to the groove direction. The curvature induced by the dislocation is in the plane of the cell creates an edge that is perpendicular to the groove direction and has a component that is parallel to the cell normal. This curvature should be sufficient to pin the defect state and annihilation points in the vicinity of the slip. In practice, the curvature is greater than $1\pi/\mu m$, preferably greater than $2\pi/\mu m$ and often greater than $5\pi/\mu m$ or in other words the radius of curvature is less than 2 μm, preferably less than 1 μm or even less than 0.4 μm.

FIG. 8f shows two slip dislocations in near proximity that doubles the number of pinning sites, thereby helping to ensure Defect state pinning occurs even if one slip on its own is not effective.

Figure 1A:
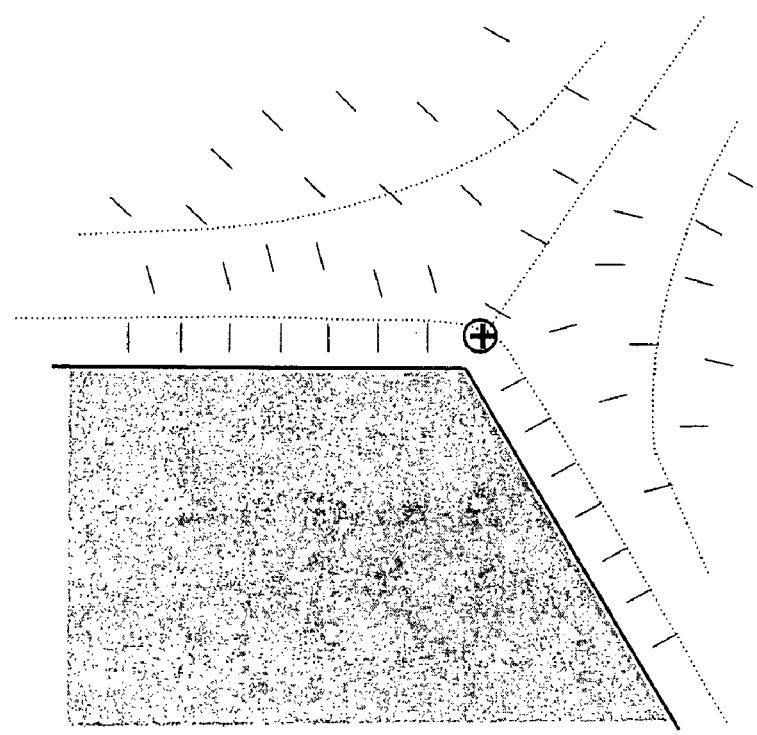
Figure 1B:
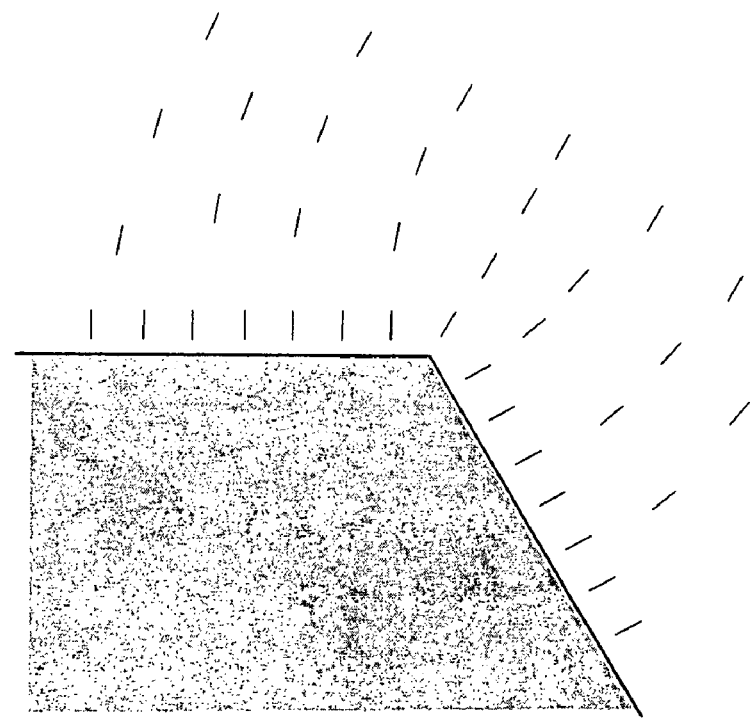
Figure 2A:
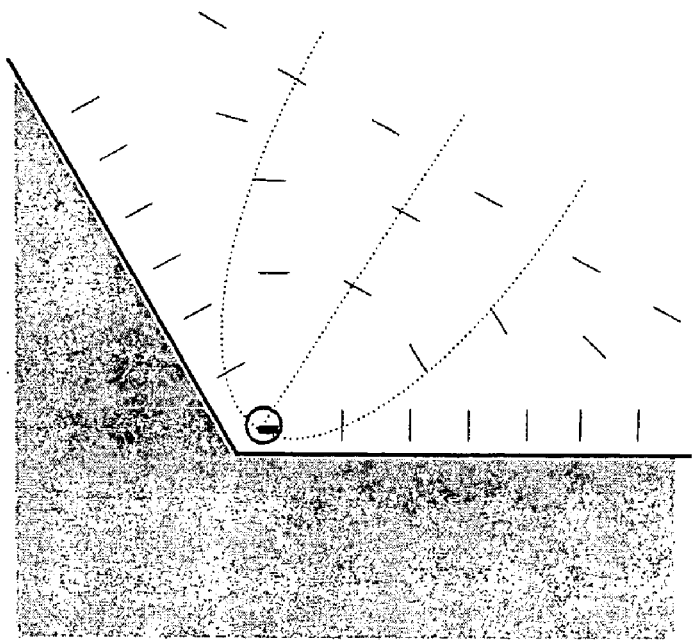
Figure 2B:
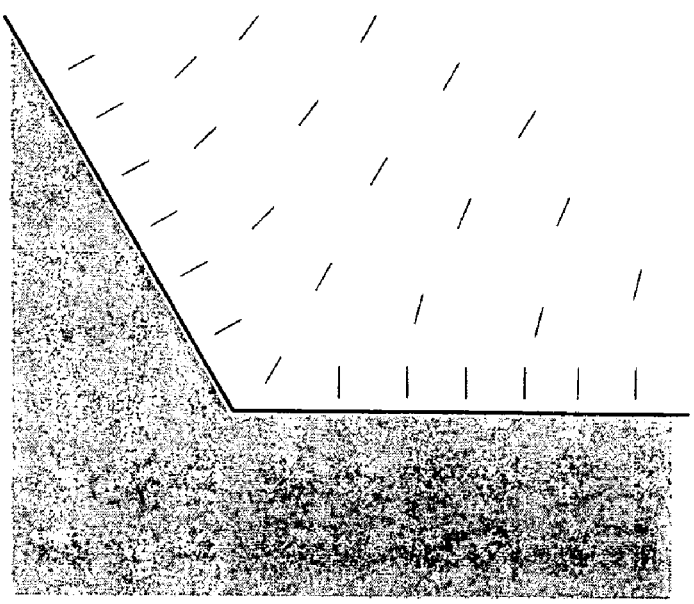
Figure 8F:
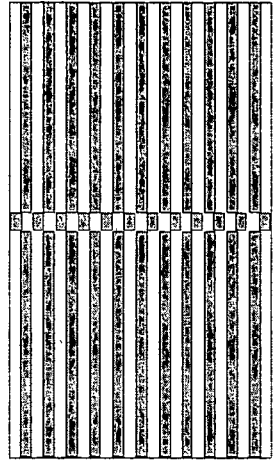
FIGS. 8f and 8g show gratings with a mixture of neck like and gap like breaks.
Figure 8G:
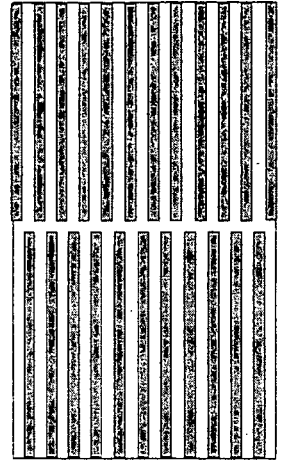

FIG. 8g shows a mixed dislocation involving both slips and necks. This type of break may help ensure that the corners remain well defined in practice. Some grating production techniques may not be able to replicate the rapid change in grating shape at the slip, tending instead to give a more gentle, "S"-like slip that has no or weak Defect state pinning properties. This arrangement would help ensure that the minimum degree of curvature at the slip would be sufficient to pin the Defect state.

Figure 8H:
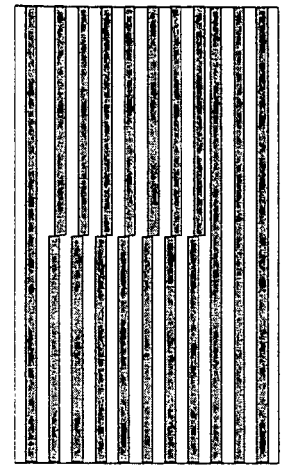
FIG. 8e shows a repeating slip pattern where a unit consisting of one grating displaced with respect to another is repeated.

FIG. 8h shows a partial slip, bordered by areas with a change in mark-to-space ratio of the grating. This type of slip may be useful where regions of multistable operation are bounded by monostable regions. It may be preferable to have no breaks in the monostable region if, for example, the Continuous state is required in that region.

Figure 8I:
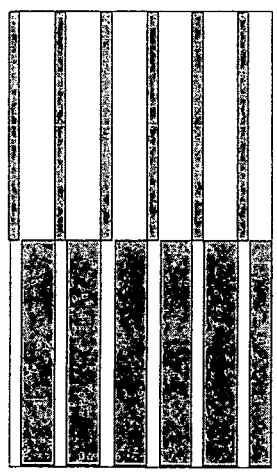

FIG. 8i shows a break in which there is a change in mark-to-space ratio of the grooves across a dislocation line. This may lead to different Defect states either side of the break.

Figure 8J:
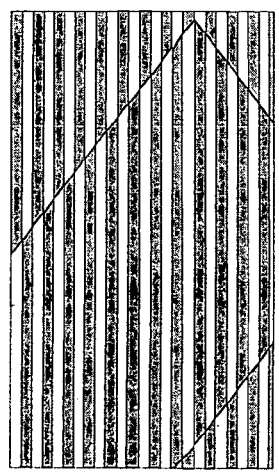
Figure 8K:
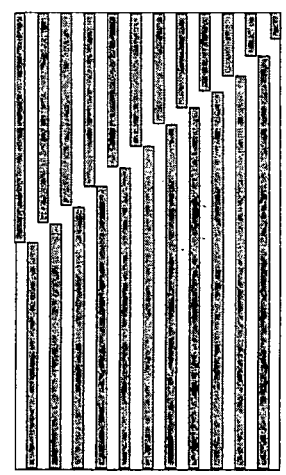

FIG. 8j shows a slip dislocation that is not parallel to the normal of the groove direction. In this example, the angle of the slips is also shown to change, forming a zig-zag pattern across the region. As with FIG. 8c, the dislocation in this instance has no finite width. In practice, it may be difficult to reproduce the fine features in the grooves required to ensure this. Therefore, the situation shown in FIG. 8k may happen in practical embodiments. This shows an angled slip plane in which the rectangular ends to each ridge (or groove) are maintained. This will have a similar effect to combining the effect of gaps, necks and slips together.

A gap is shown in greater detail in FIG. 9. This is a 3D representation of the grating surface that includes a gap and the shows position of the defects in the Defect state close to the grating surface. Using the same numerals as FIG. 7 the +½ defect 20 is shown using horizontal shading and the −½ defect 22 with vertical. Note that the diagram shows the situation with homeotropic boundary conditions, the position of the defects would be reversed with a locally planar alignment. The gap 40 creates a convex surface that joins the horizontal top convex edge of the groove to the horizontal concave edge at the bottom of the groove. The lowest energy configuration for the +½ defect 20 is to follow this edge, bending around the top corner at B, and annihilating at the bottom corner of the break at the annihilation point A where it meets the −½ defect 22. As described earlier, the director configuration close to the grating in the Defect state has a low surface pretilt. FIG. 9 shows the situation where there are no defects behind the gap; i.e. the gap marks the boundary between the Defect state (front) and Continuous state (rear), of low surface tilt and high surface tilt respectively. Unlike the situation shown in FIG. 7 the annihilation point is no longer free to move over the surface. This provides a pinning site for the defect lines in the Defect state, since there is an energy cost associated with moving the defect away from the vertical edge.

The asymmetry of the trapezoidal grating in FIG. 9 is sufficient to always cause the correct sign of bend at B. Even if a symmetrical grating (e.g. with a rectangular cross section) is used the configuration shown is still the lowest energy since the overall defect length is minimised. Moreover, the array of defects induced by the grating helps ensure that defects are formed in the same pattern at each break.

FIG. 10 shows the opposite break, a positive "neck" in the grating. The effect of this is similar to that of the gap, except now the vertical edge introduced by the break according to the present invention is concave, and the annihilation point occurs at the top corner of the break.

A grating with this structure was produced on top of an ITO coated glass substrate in the following manner. A chrome mask designed with the structure shown in FIG. 8b was produced with alternating strips of 500 nm chrome, 500 nm clear, and with gaps 500 nm wide spaced 12 µm apart (and shifted through 4 µm on adjacent grooves). A positive photo-resist material was spun coated onto a second substrate, baked, the mask put in contact with the photo-resist and exposed to deep UV light at a slight off normal angle (8°) in the direction perpendicular to the groove direction g. After developing the substrate and etching the exposed photo-resist away, the grating master forms a negative of the desired structure. This master was then used to emboss the desired structure on the ITO coated substrate, either directly or using an appropriate number of copies made from the master. An example of an embossed grating is shown in the SEM in FIG. 11. With embossing, the troughs of the grating are formed from the ridges in the master or even generation copies thereof; hence a master that includes gaps will lead to a final grating structure with necks.

This figure shows typical surface curvatures that can give bistability. The pitch of this sample was 1 µm. The curvature of the neck structures added into the grating according to the present invention is more than |1 π/µm|, being approximately |2 π/µm| in the example shown. In some situations, e.g. for very high anchoring energy, or low order parameter S, it may be advantageous to use a lower curvature, but less than $0.2\pi/$µm is likely to be too weak a curvature to cause any substantial pinning energy for the defects. Curvatures higher than |2 π/µm| (or a radius of curvature of less than 1 µm) are also suitable with an upper limit (dictated by the liquid crystal elasticity and local surface anchoring energy) that is not found in practice using the grating fabrication method described. For a multi-stable device, the relative energies of the different states will be dictated by the relationship between the magnitude of the surface curvature, pitch and amplitude of the grating, local surface anchoring energies and the elastic properties of the liquid crystal material.

The breaks may have different strengths, as indicated in FIG. 12. In this example, the degree of bend occurring at B is related to the gradient of the convex edge of the grating from B to A as shown. Moreover, the break may be incomplete, in which the concave/convex edge does not meet at a point.

Figure 13A:
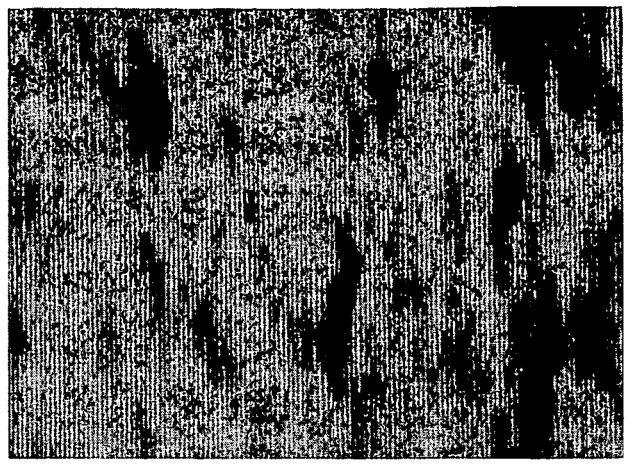
Figure 13B:

A cell was constructed using the grating substrate of FIG. 11 spaced at 5 µm from a flat, ITO coated glass substrate with a mono-stable homeotropic treatment. After filling with the commercial liquid crystal material MLC 6204_000, the cell was observed in transmission between crossed polarisers on an optical microscope with the polarisers approximately at 45° to the grating direction. Latching between the Defect (white) and Continuous (Black) state occurred following bi-polar electrical pulses applied to the ITO electrodes that were of appropriate amplitude, duration and polarity. It was noted that latching was very uniform compared to a control area where there was no breaks in the grating. The pulse amplitude was then lowered so as to cause partial latching from one state to the other. FIG. 13a shows the sample immediately after a pulse that latched approximately 40% of the pixel area to the Continuous (black) state. The grating breaks are clearly visible in this diagram as an array of points, since they form a small (approximately 1 µm²) domain of Continuous state at each point. A photograph of the same area was taken a minute later, as shown in FIG. 13b. Although there is some shrinkage of the defect domains, it is to within a satisfactory level. Areas without breaks grew almost immediately to the Continuous state, as illustrated with respect to FIGS. 14a-14c.

Figure 14A:
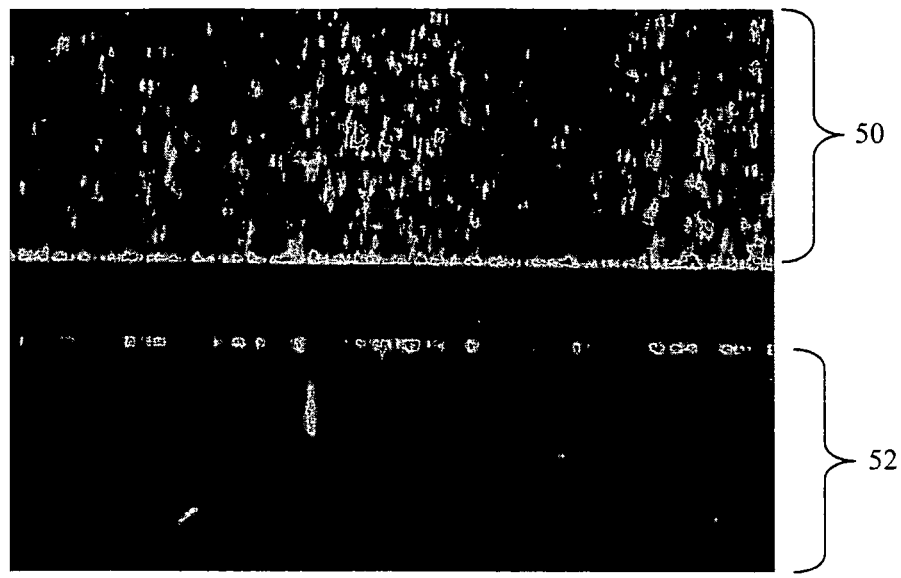
Figure 14B:
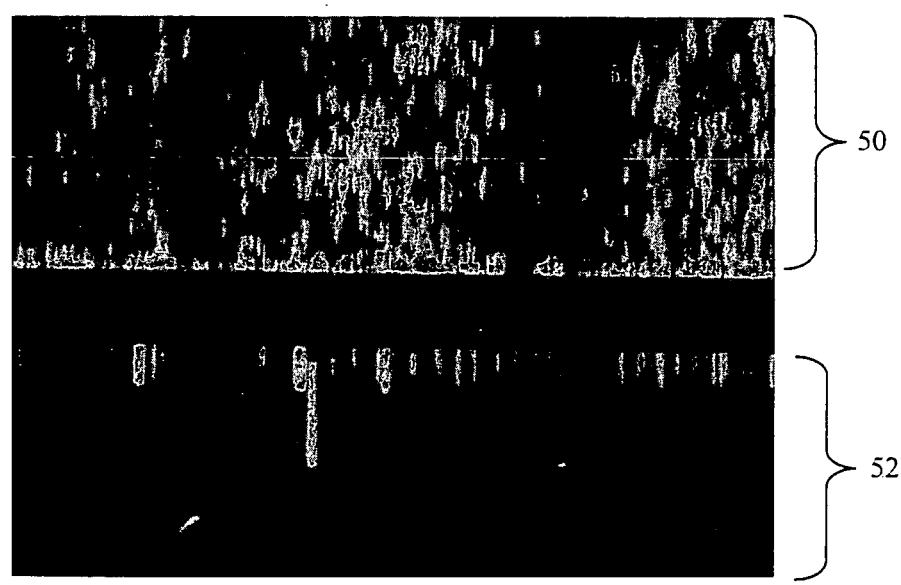
Figure 14C:
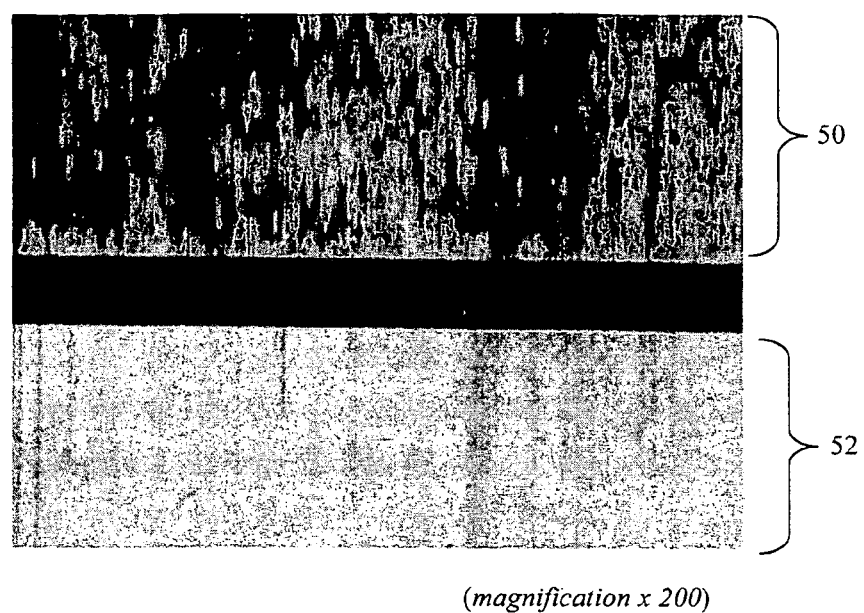
Figure 15A:
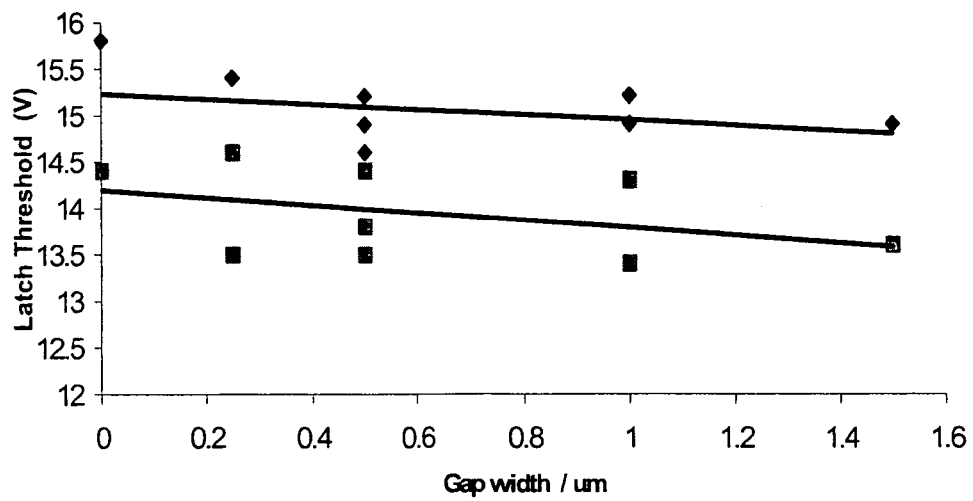
Figure 15B:
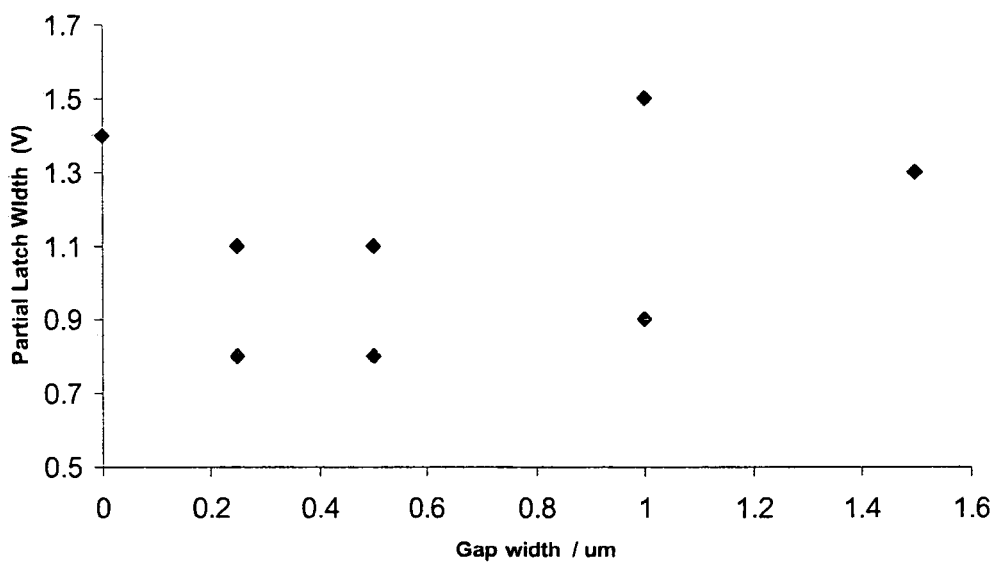
Figure 16A:
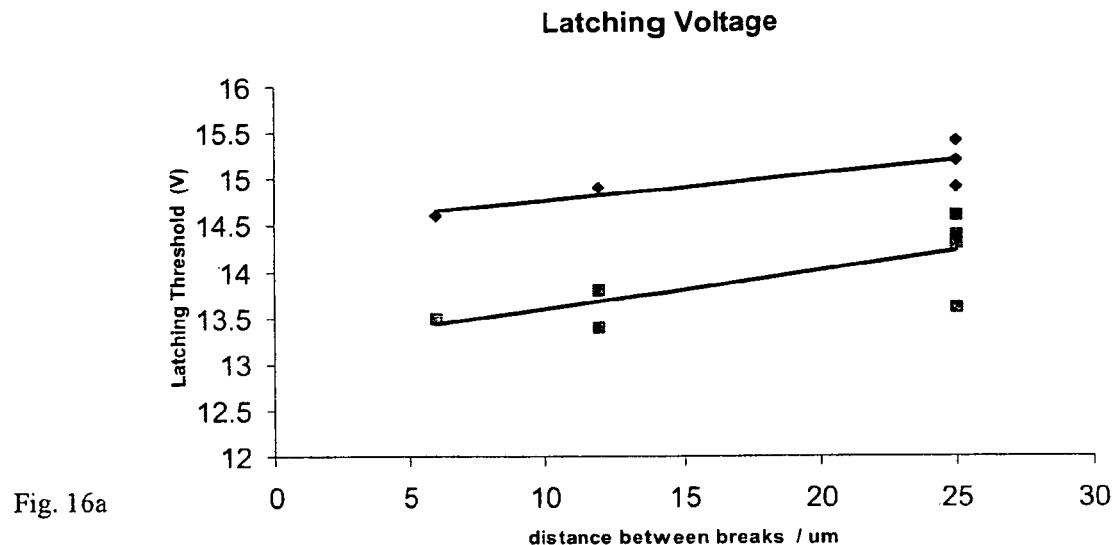
Figure 16B:
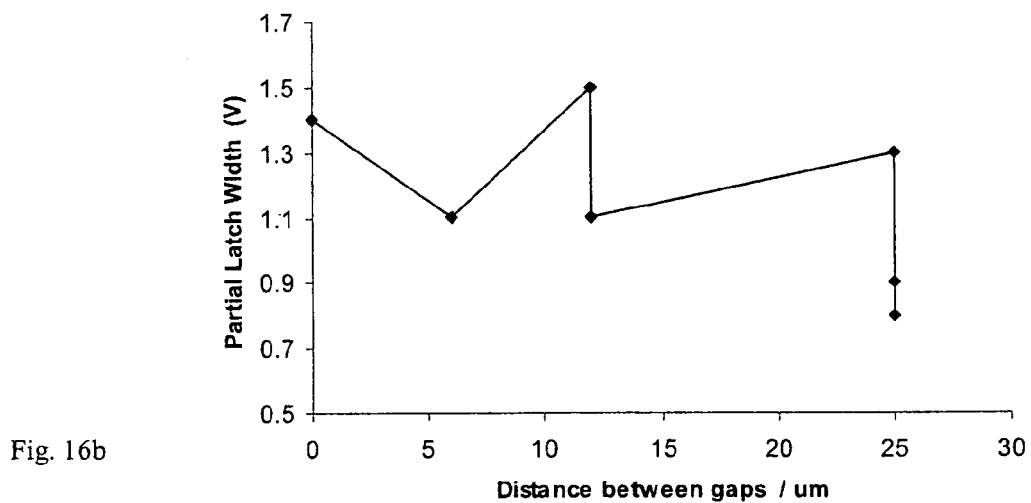

A similar sample, but this time arranged to give gaps in the grating, was heated to 50° C., 15° C. below the clearing point $T_{NI}$. At this elevated temperature the sample is inherently more Defect D state stable. The pixel having breaks 50 was partially latched into the Defect state and compared with a control area 52 with no such breaks. FIG. 14*a* shows the situation after latching. It can be seen observed that the same voltage applied to both the grating area 50 having breaks and the control area 52 caused more latching to the Defect state in the area with breaks acting as defect loop pinning sites. That is, the threshold for C to D latching is reduced by the presence of the gaps, since the break acts as a nucleation site for the transition. This has the advantage of allowing lower voltage operation or faster line address times as compared to conventional devices. Two seconds after the pulse, as shown in FIG. 14*b*, the area without gaps begins to show significant growback to the more stable Defect state, i.e. white lines can be seen beginning to encroach into area 52, whereas there is little change in the area 50 with gaps. Within 10 seconds, as shown in FIG. 14*c*, the unwanted Defect state had spread wholly across the control area 52 of the pixel, whereas the change to the broken grating area 50 was minimal. At these elevated temperatures, the D state grow-back, even for pixels wholly latched into the Continuous state, can be severely limiting to the device. The temperature range of satisfactory operation has previously been found to be 45° C. at most. Use of the broken gratings, i.e. gratings having breaks in the grooves, has allowed devices to be driven to within 3° C. of the clearing point (which is over 60° C. for MLC 6204_000).

FIGS. 15*a* and 15*b* and 16*a* and 16*b* illustrate the positive effect of breaks on device latching thresholds, both as a function of gap size and density, i.e. distance between breaks. The control sample without gaps is plotted as a gap 0 µm. There is a slight tendency for the latching voltages to decrease with increasing size of gap. This is possibly due to the increased effective field in the vicinity of the gap, as there is less dielectric drop across the grating, which then acts as a principle site for nucleation of latching.

Referring back to the high magnification photograph of FIGS. 14*a*-14*c* it can be seen that the gap or neck can lead to a small area of Continuous state centered on the break. Although very small, this might cause a significant change in the optical properties of the Defect D state, potentially leading to reduced transmissivity, or reflectivity, of the display device. Moreover, the gap or neck acts as a nucleation site for growth of the Continuous state. This might give unwanted grow-back to C, induced, for example by the RMS effect of the applied field applied to other lines during multiplexing. It is a further aim of this invention, therefore, to provide breaks which act to pin the defect lines or defect loops in the groove direction, but without the unwanted effect of providing monostable areas. This may be achieved using the type of break structure referred to as a slip, as shown in FIGS. 8*c* and 8*d*.

A slip grating break is shown schematically in FIG. 17. Again the boundary between Defect (front) and Continuous (rear) states is shown, with only the ±½ defects shown, 20 & 22, rather than the director configuration. Here, the ridge of the groove is shifted suddenly, creating a phase difference in the periodic structure, but maintaining properties such as the pitch, mark to space ratio and grating shape. This slip then introduces a concave edge and a convex edge together, but shifted through the distance, s. Either edge may act to pin the defects, depending on whether the front area is Defect, the rear Continuous (as shown), or the front area is Continuous and the rear is Defect.

Figure 18A:
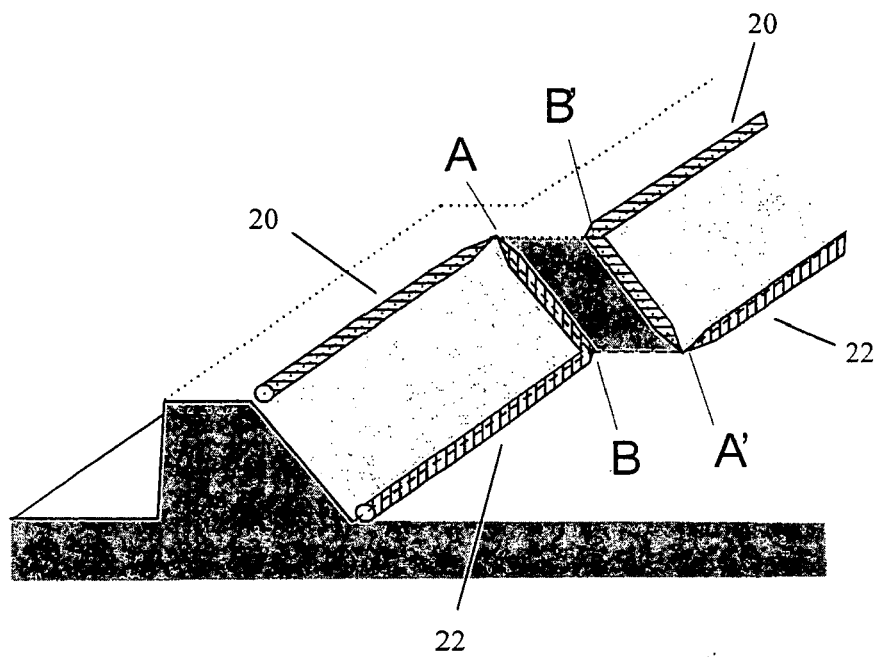
Figure 18B:
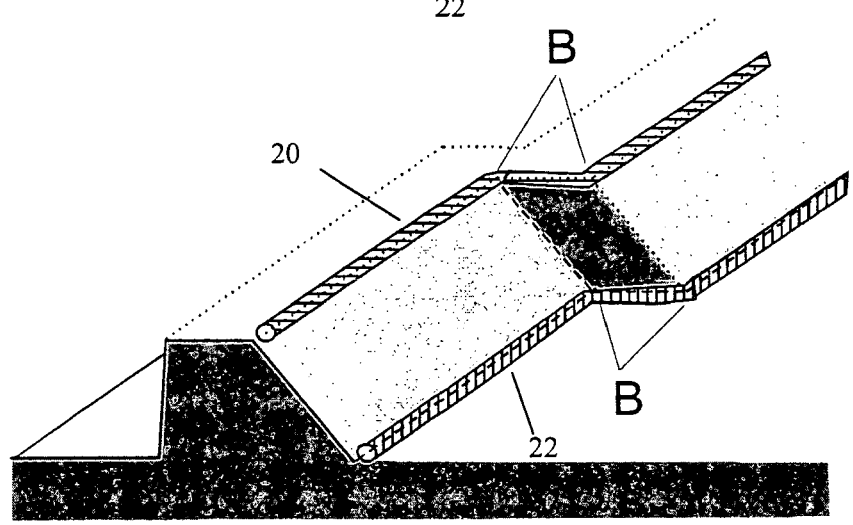

FIGS. 18*a* and 18*b* show two possible configurations for the configuration at a slip where the pixel area is in the Defect state on both sides of the slip. In the case shown in FIG. 18*a*, the defects follow the vertical edges of the slip and create two annihilation points. This configuration may lead to an unwanted area of Continuous state—particularly as the slip is shown to have a depth in the direction parallel to the groove direction g in this example, which might occur in practical manufacture. However, the ±½ defects 20, 22 can alternatively keep to the top convex and bottom concave surfaces, and merely follow the change in phase induced by the grating shape. This configuration is most likely if the distance s is less than the groove amplitude (provided the energy cost of the defect bend B is sufficiently low). For a full grating (rather than the single ridges shown here) the maximum phase shift is the greater of c/p or (1-c/p), which is usually much lower than the grating amplitude. The optimum phase of slip for a grating will depend upon the asymmetry and curvature of the surface profile repeat unit.

Hence, slips have all of the advantages found with gaps or necks but maintain the good optical performance of the device by avoiding or minimising the possibility of areas of incorrect state being formed. That is, the slips cause the least disruption to the director configuration in the two states, which remains substantially uniformly aligned at the grating surface. This is shown in FIGS. 19*a*-19*f*, where a grid of gratings with slips is shown on the left (the groove direction being vertical as shown), next to a control area without slips. FIG. 19*a* shows the situation immediately after latching with FIGS. 19*b, c, d, e* and *f* showing images after 1, 2, 3, 4 and 5 seconds respectively. It can be seen from FIG. 19*a* that the area having breaks achieves partial latching whilst the control area does not, illustrating that the presence of breaks aids in formation and maintenance of domains. It can be clearly seen, looking at the sequence of images, that the whole pixel with breaks was able to maintain a partial latched state without substantial grow-back, even at this elevated temperature, whilst the control area showed considerable grow-back of the lighter Defect state. FIG. 20 shows a panel comprising a repeat of three areas of different grating pitch. The groove direction g runs up and down the page. Area a has a repeat unit having a first pitch, in this case 0.6 µm, area b a different pitch, 0.8 µm and area c a different pitch again 1.0 µm. Each area has a length equal to 12 µm. Areas a, b, and c therefore represent sub-pixels having different profiles so as to have different latching characteristics allowing areas of both states Continuous and Defect to be formed. FIG. 20 shows the situation after area a has been latched to Defect state, whilst areas b and c are Continuous state. Because the three pitches are different the interface between the three areas effectively result in slips of varying phase shift at each edge. However as the pitch varies there are areas where grooves of the adjacent areas almost overlap. It can be seen from the image that area b had five distinct bands. This is due to grow-back from area a at these places where the alignment is such so that there is no effective slip. This suggests that, for typical grating manufacturing methods, the phase shift of the slip should be in the range π/2 to π.

FIG. 21 shows how slips might be used in a grating mask designed to give three different pitches. With such a device, both 4 error-free greys and a high degree of error-containing greys will be achieved. Three sub pixel areas are therefore formed, areas A, B and C, each having a different pitch, respectively 0.6 µm, 0.8 µm and 1.0 µm. The groove direction of each sub-pixel is from side to side as shown. It can clearly be seen however that each area has a plurality of groove segments separated by slips.

Such a device could then display three error free grey levels per pixel using the different latching thresholds of each sub-pixel area. However grow back from one sub-pixel to another or from the inter-pixel gap is minimised by the presence of breaks. Further the presence of breaks aid the partial latching window allowing error free greys to be achieved.

FIGS. 22a-22c show three further examples of gratings designed according to the present invention. FIG. 22a shows an example that combines the present invention with the type of device described in WO01/40853. In this embodiment, the device has a plurality of regions and the grating groove direction is different in adjacent regions. Within each region, there is a slip break in which the grating groove direction g remains the same or substantially the same either side of the dislocation plane. If the device were designed according to WO01/40853 such that each of the regions with a single groove direction was 15 µm or less in dimension, then the addition of the breaks according to the present invention would lead to improved performance of the device. For example, the device may be required to cause scattering in the Defect state, and much less scattering in the Continuous state. The slips act to stabilise the Defect state, prevent growback to the Continuous state (or vice versa) and thereby improve the operating window.

FIG. 22b is a grating designed according to the present invention wherein slips are repeated at a distance equal to or less than the grating pitch. If the phase of the slips were 180° the resulting structure would be a bi-grating similar to that of FIG. 4c. Such a structure would no longer have a single groove direction at any point, but would have two orthogonal grating grooves. This would be equivalent to an embodiment of WO01/40853. However, because the phase of the slip is significantly less than 180°, preferably being about 90°, the single groove direction g is retained. This means that the structure has a very high density of Defect nucleation and pinning sites, but that the liquid crystal director has a uniform orientation within the region in both Defect and Continuous states.

FIG. 22c shows a slip plane wherein there is a slight change in groove direction on either side of the break. This is the type of change that may occur where there is a gradual change in groove direction from region to region. Alternatively, the grooves may be misaligned slightly due to some experimental error.

Figure 23A:
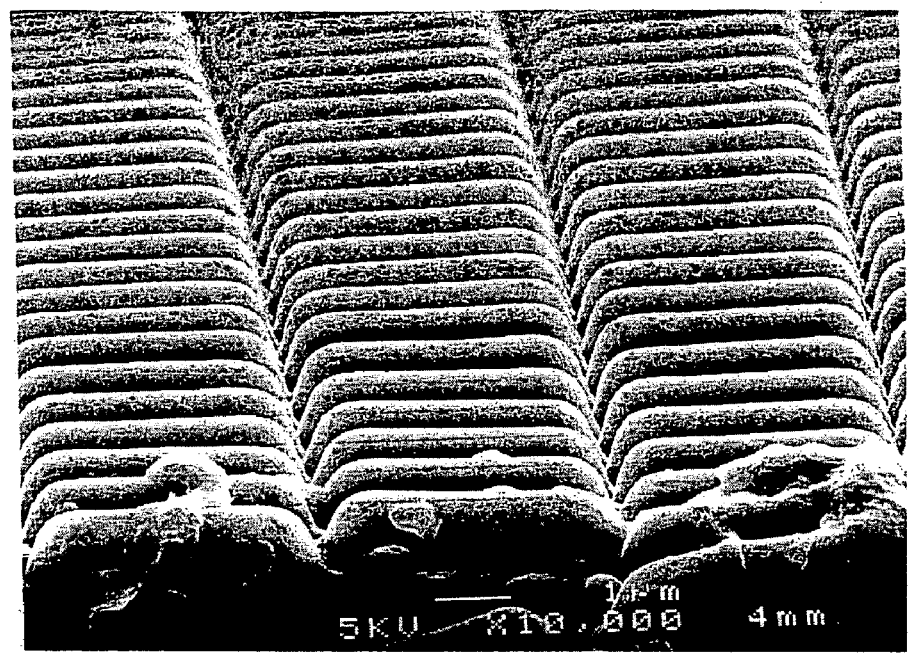
Figure 23B:
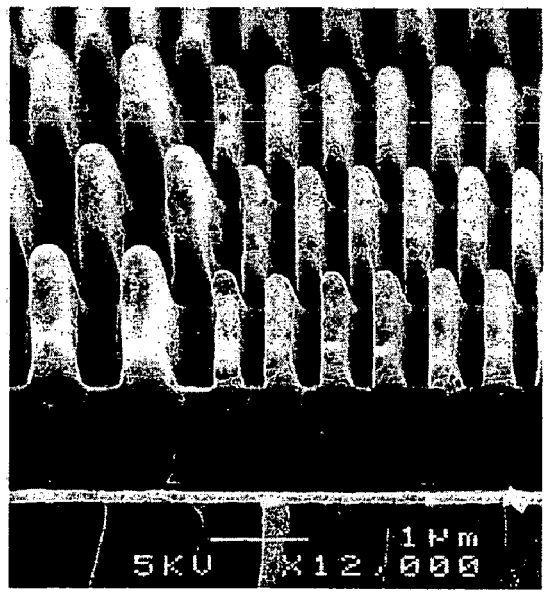

FIGS. 23a and 23b show SEM images of two gratings with negative slips occurring every 4 µm. FIG. 23a shows a grating having a pitch of 1 µm whereas FIG. 23b shows the boundary between an area of pitch 0.8 µm on the left and 0.6 µm on the right.

FIG. 24 shows an SEM image of a grating having a positive slip for a grating with 0.6 µm pitch.

It is also possible that there can be advantage to the optical disruption caused by the director distortion about a break. For example, the optimum gap size is likely to be of the order of half the pitch (i.e. 0.25 to 0.75 µm). However, if larger breaks are used with a high density, it may be possible to use the deformation of the director around each break to give some scattering of the light. The scattering will be higher in the Defect state (which should therefore be made the white state) than the Continuous state. This scattering will act as an internal diffuser. Taken to the extreme, it may be possible to design the breaks to allow a flat reflector to be used, thereby reducing the number of steps in the cell process, with the expense of the diffuser appearing in the mask design only.

As mentioned a useful embodiment of the invention is the introduction of grating phase shifts, or slips, of between 90° and 180° phase difference. The slips are arranged to occur at least close to the pixel edges running perpendicular to the groove direction g. If the slips are not near the edges of the pixel the amount of pixel that may growback to the wrong state is increased, however too high a density of breaks may have an effect on pixel contrast.

Imagine a device where the Defect state is arranged as a Twisted Nematic (TN) configuration and is the black state. The Continuous state is a Hybrid Aligned Nematic (HAN) state and appears white. If the pixel pitch is P and the average slip spacing is x then the number of slips per pixel, N, is:

$$N=\text{INT}(P/x)$$

For P>>x this simplifies to;

$$N=P/x. \quad \{\text{eqn 1}\}$$

In the worse case scenarios the pixel edge that is parallel to the slip (and hence perpendicular to g) will be close to the slip but on the wrong side. In this case, a region that is almost x wide may be in the wrong state. If this situation occurs on both sides of the pixel then there is a total brightness error per pixel $\epsilon 1=2x/P$. Typically, the interpixel gap cools into the Defect state and largely remains unchanged during driving. After latching a pixel to the Continuous state (white) the Continuous domains may shrink back to the closest slip to the pixel edge, as the Defect state spreads from the inter-pixel gap.

To minimise the error $\epsilon 1$, it would be ideal to include a slip close to each pixel edge, as shown in FIG. 25. The closer to the edge of the pixel, the more effective the slip would be. Indeed, it may be advantageous for the slip to be located slightly outside the pixel area, since this area may still be addressable due to the in-plane electric fields that occur at the pixel edges.

Accurately aligning the slips with the pixel edges may add cost to the fabrication, requiring expensive mask alignment equipment. It may not be practical to use this approach if the grating is embossed into a photo-polymer layer over the electrodes. Moreover, this requires a separate grating design for each electrode arrangement. In practice, therefore, the grating is designed to have a high slip density, to help ensure that a slip occurs close to each interpixel gap. This also helps reduce the spread of the unwanted state when nucleated from defects in the cell, changes in temperature or through mechanically induced flow.

Figure 26:
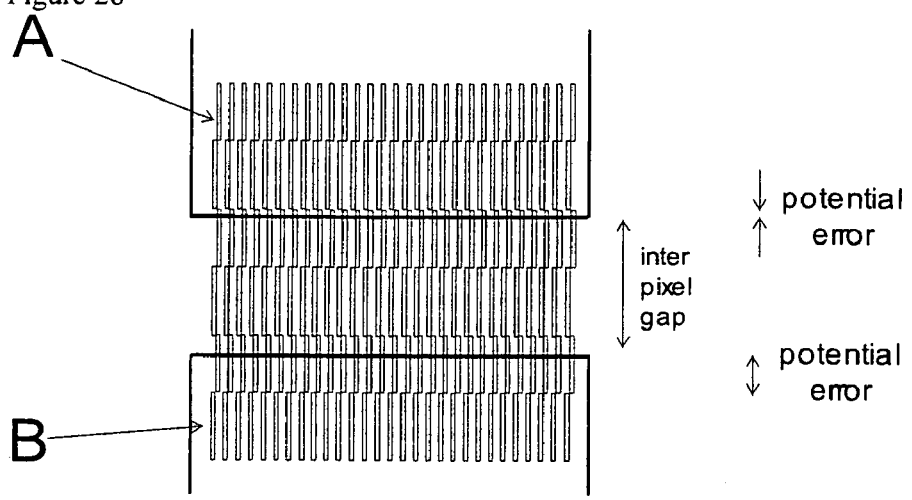
Figure 27:
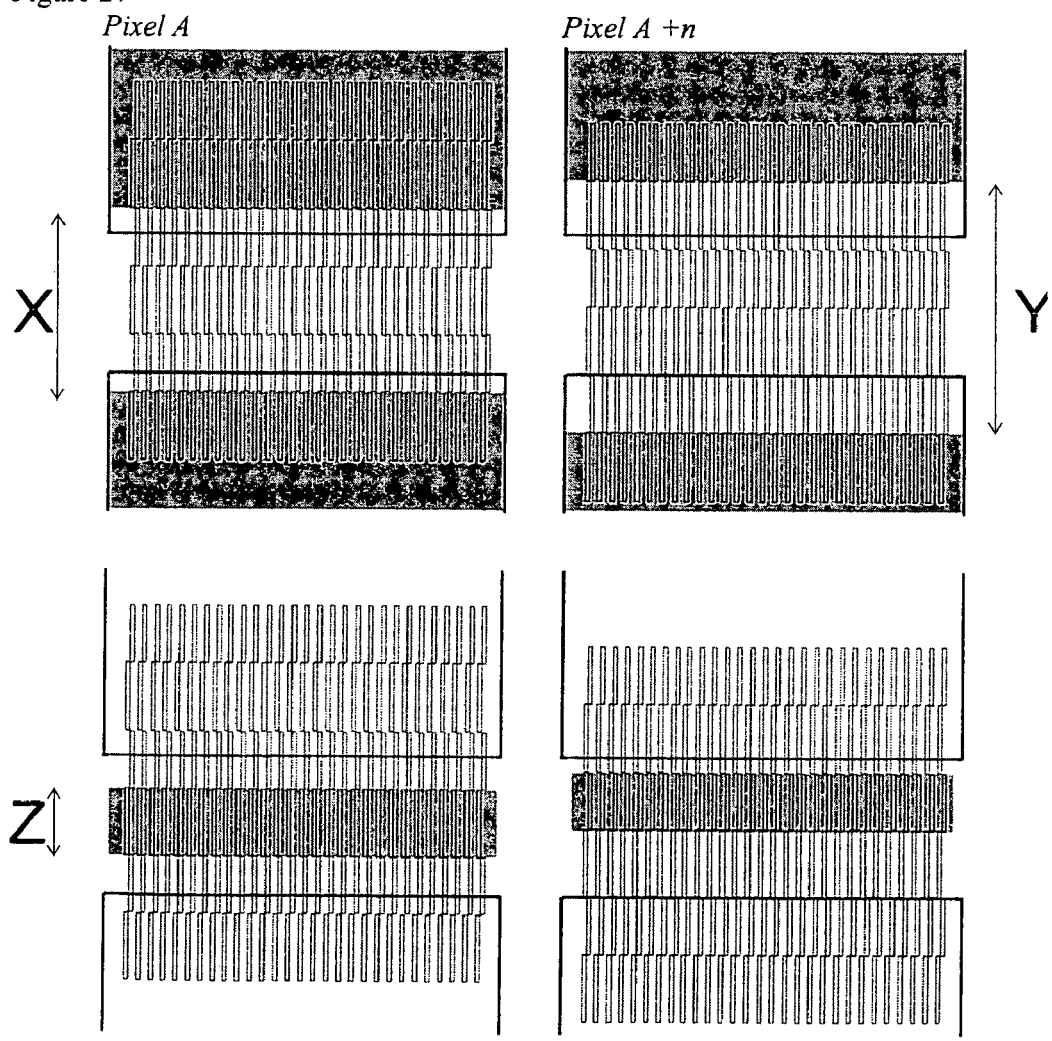

The errors that may occur at an inter-pixel gap are shown schematically in FIG. 26. These errors will change across the display in a direction parallel to g, unless there is a precise match between the pixel pitch and the slip separation. Two possible arrangements of the same grating pattern are shown on the left and right sides of FIG. 27. Such differences may occur at different pixels on a display, for example in pixel A in FIG. 27 and pixel A+n, where n is some integer. FIG. 27 also shows the appearance of the inter-pixel gap for either pixel where the interpixel gap is white, i.e. the white state is the lower energy state (shown in the top pixels), and when the black state is the lower energy state (the lower part of the figure). Clearly, the apparent width of the inter-pixel gap may change, depending on the arrangement of slips with respect to the electrodes: The white inter-pixel gap between pixels latched black may have a width X or Y as shown in FIG. 27.

If the distance between the slips is kept small, then the difference between X and Y will also be small. However, for regularly spaced slips this may still lead to noticeable artefacts. For example, Moiré fringes may occur as the inter-pixel width oscillates consistently from pixel to pixel. Such fringes can be noticeable even if the difference in gap varies by a few microns or so, if the variation is regular and on a length scale that is a few mm or so. Two approaches help resolve this problem are to orient the grating and the slips at an angle to the inter-pixel gaps, and ensuring that the slips are spaced randomly. A zenithal bistable device display was fabricated and arranged to be TN in the Defect state and HAN in the Continuous state, corresponding to white and black states respectively. The display uses a grating designed with slips pseudo-randomly spaced at 7 µm, 8 µm and 9 µm. Care was taken to ensure that the same average spacing was maintained over length scales corresponding to the pixel size at most. For example, the same number of slips with 7 µm, 8 µm and 9 µm period were used for length scales of about 100 µm (eg five slips of period 7 µm, and five periods of 8 µm and five at 9 µm but in a random sequence, such as 7:7:9:8:8:9:7:8:9:8:9;7:8: 9:7). This pattern may then also be changed for the next sequence, and so on. Optical photomicrographs of this display are shown in FIGS. 28a and 28b, with FIG. 28a showing a partially latched state and FIG. 28b showing the display fully latched into the Defect state. It can be seen that in the partially latched state the slips pin the domains of Defect and Continuous states.

It can also be seen in FIG. 28b that each slip also leads to a brightness error $\epsilon 2$ from its finite thickness. In the present examples, the Defect state appears white, and the slip appears as a dark band. This may be due to the formation of a thin line of Continuous state at the slip, or due to the refractive effect associated with the change in refractive index around the slip. In either case, the slip causes a reduction in total brightness across a white pixel, or increases the transmission of a black pixel. Clearly this error can lead to a degradation of display performance, including reduction of brightness and/or reduction of contrast ratio. For this reason, it is important to design a grating to be used as a bistable liquid crystal alignment layer according to the present invention in which $\epsilon 2$ is minimised.

Figure 29:
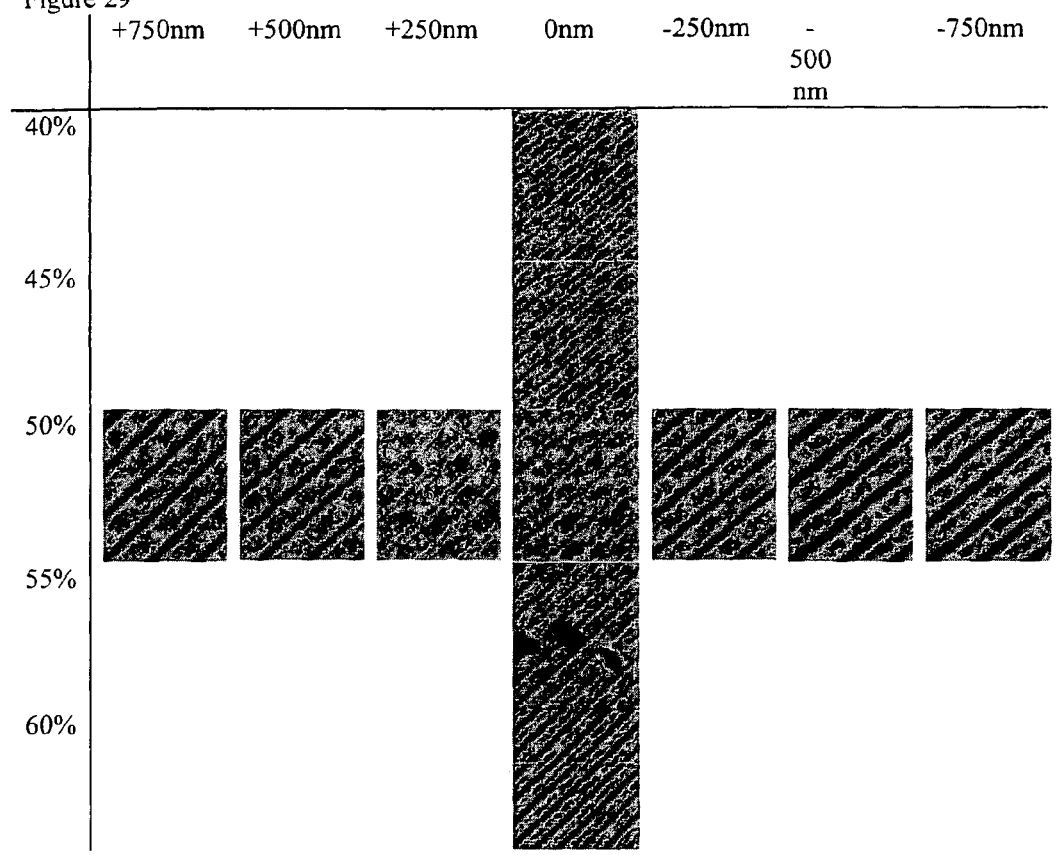

FIG. 29 shows several practical examples of Zenithal Bistable Grating cells using the present invention. The figure shows photomicrographs of 4 µm spaced slips as a function of slip separation (which varies from left to right) and percentage of chrome in the mask, i.e. mark to space ratio, which varies from top to bottom. All cells were latched to the Defect state to appear white. The slip appearance was found to depend on a number of factors, including the design of the mask and the photolithographic process used to define the grating.

Figure 30A:
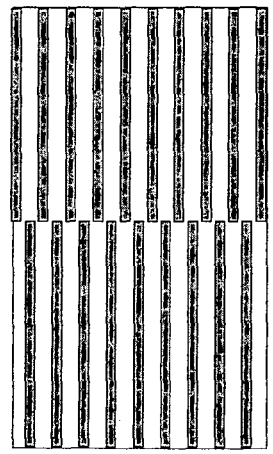
Figure 30B:
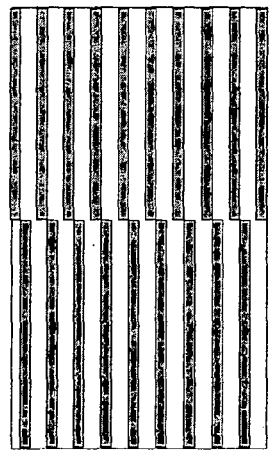
Figure 30C:
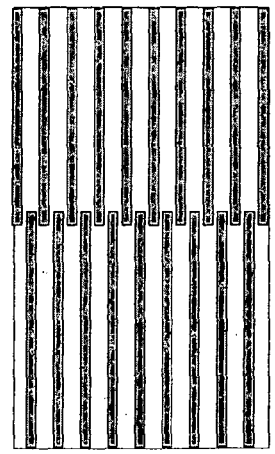

The examples shown in FIG. 29 are variation of the mask parameters, mark to space (top to bottom) and interleave of the slip. A positive interleave is shown in FIG. 8g: the slip is combined with a row of gaps. If the interleave is negative, the slip will be combined with a row of necks, for example as shown in FIG. 18. Where the mark to space ratio is less than 50%, it is possible to have a negative interleave such as that shown in FIG. 30c. Note, FIGS. 8a-8j and 30a-30c show the design for two-level photolithography masks and not the final grating produced by that mask in photolithography or other manufacturing process (e.g. ruling, embossing etc). FIG. 29 shows that the apparent width of the slip $\epsilon 2$ is lowest for a +250 nm inter-leave if the mark to space is 50%) and may also be reduced by using a lower mark to space ratio.

Figure 31A:
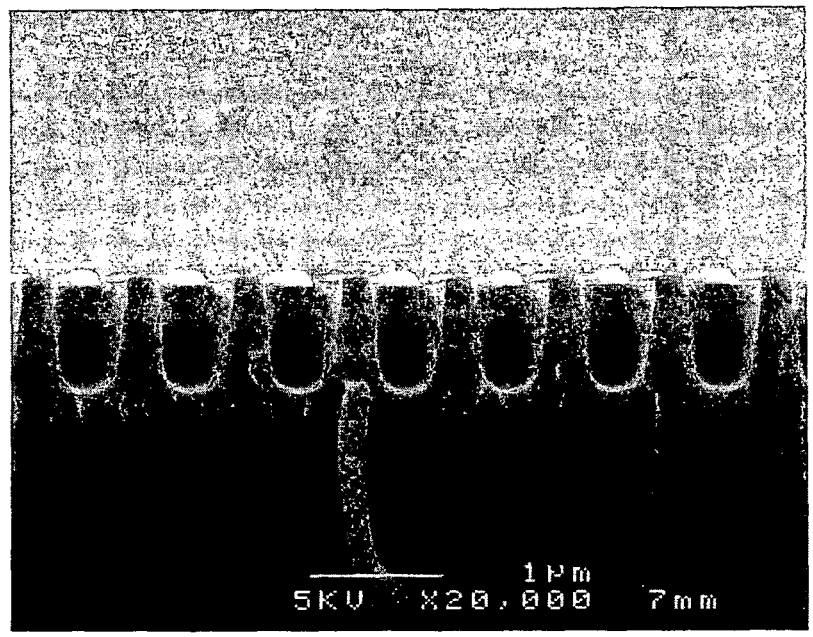
Figure 31B:
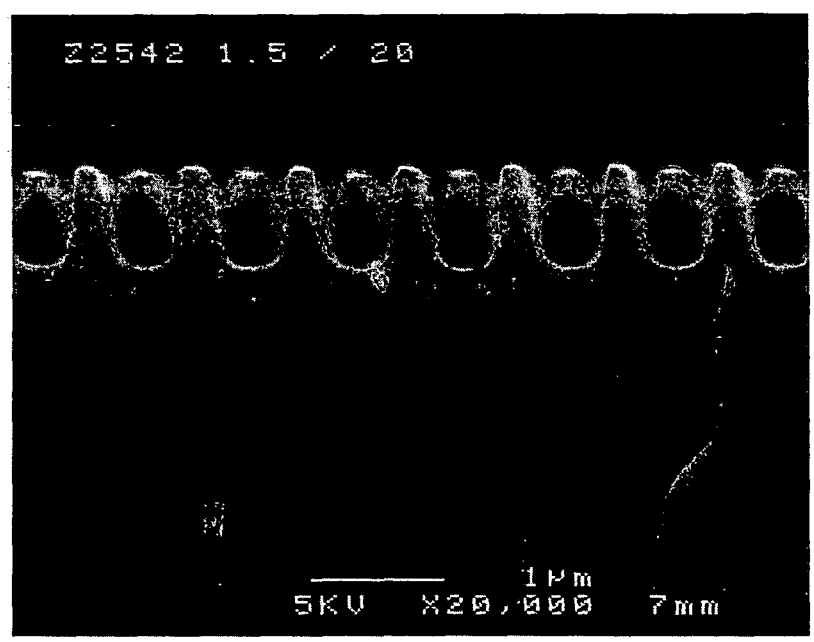

These results are very specific to the conditions used to fabricate the grating. FIGS. 31a and 31b show SEM photomicrographs of two different gratings of the present invention, produced using the same mask (0.8 µm pitch, 50% chrome and 50% clear, 180° phase change at each slip and a 0 µm interleave) but embossed from masters produced using different exposure conditions. In FIG. 31a the slips are formed from a ridge running perpendicular to the grating grooves that is the same height as the grooves. In practice is has been found that this can lead to a noticeable width of slip, W, and causes a reduction in the brightness of contrast of the display. In the grating shown in FIG. 31b the slips form a much lower ridge feature and the apparent optical width, W, of the slip was much lower. Therefore, for this type of shape, the slip conditions found to give the narrowest slip (ie $\epsilon 2$ minimised) was that of FIG. 31b).

However, the fabrication conditions are also set to give many other required properties from the grating, and it may not be possible to remove $\epsilon 2$ altogether in practice. This leads to a conflict in the design between having a high number of slips to minimise $\epsilon 1$ at the pixel edges, and having a low number of slips to reduce the overall effect of $\epsilon 2$. Assuming for simplicity, that the slip is fully black over the distance W (see FIG. 28), then the $\epsilon 2$ error for a white pixel is proportional to the total number of slips across the pixel multiplied by the pixel width, thereby giving:

$$\epsilon 2 = W/x \quad \{eqn\ 2\}$$

Equating equations 1 and 2 gives the slip density x where the total error is minimised:

$$x = \sqrt{\frac{P \cdot W}{2}}$$

Hence, the grating design may be adjusted to minimise the error due to slips according to the pixel pitch that it will be used with. In practice, it is preferable for the design to be flexible, regardless of pixel size and pitch. Hence, the grating will be designed to work satisfactorily for a range of different pixel pitches, and is typically in the range 2 µm to 15 µm, and commonly in the range 4 µm to 10 µm for displays of 400 dpi to 65 dpi.

FIGS. 32a and 32b show how the present invention may be used in conjunction with a grating designed to have different properties, perhaps to provide for greyscale. In this instance, a given area may have an adjacent area in the opposite, more favoured state. At the interface between the two areas, the phase of the grating may vary from 0° to 180°. Where the phase change is insufficient to cause Defect state pinning (eg it is less than 90°), the Continuous state may spread into the first area, thereby leading to an undesired transmission state. Hence, a slip may be located close to this interface to help ensure that the lower energy state does not spread into the area after latching into the higher energy state.

Figure 33:
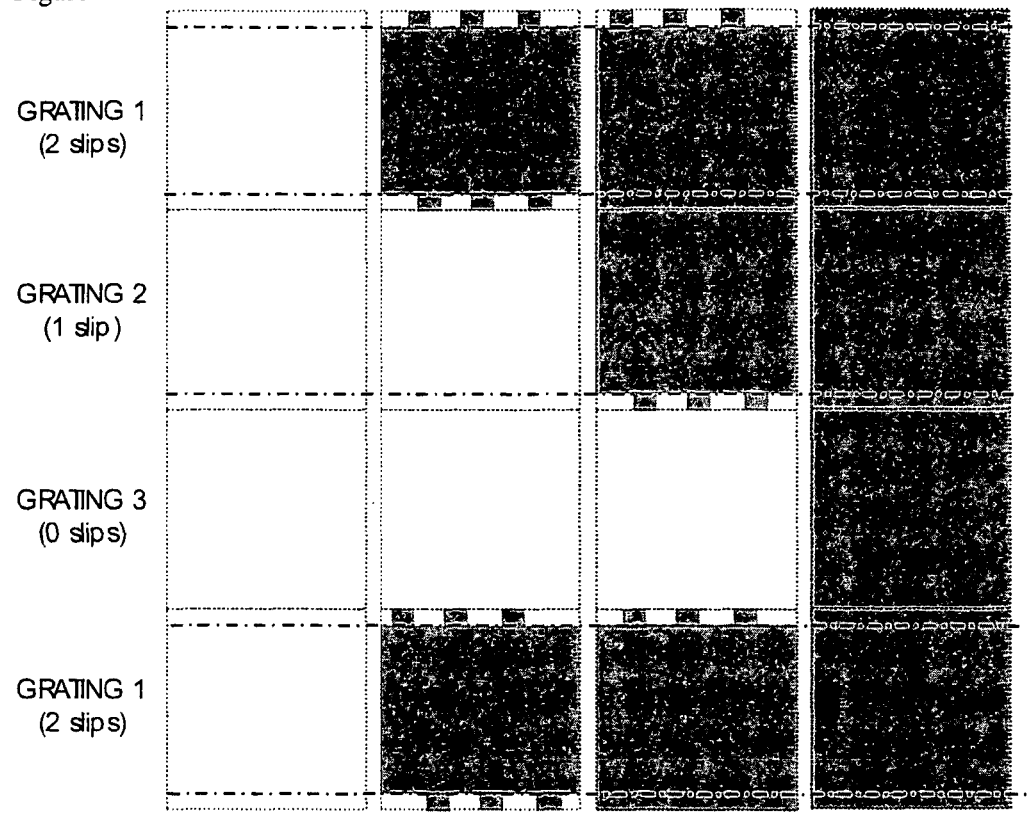

The slips may be put close to each side of each separate area as shown in FIG. 32a. For a grating with different areas designed to give greyscale, there may be a particular sequence of latching the different areas that would be known prior to the grating design. For example, (see FIG. 33) grating design 1 may latch into the higher energy, dark state at a lower electrical pulse energy (τV) than grating shape 2, which in turn latches dark before grating shape 3. Knowing this sequence, it is possible to protect all of the possible states using only 1 slip in grating shape 2, and no slips in grating shape 3.

In summary then the advantages of the invention include;

Wider temperature range—bistable operation to within 5° C. of the clearing point $T_{NI}$ has been observed for the first time to the inventor's knowledge. As the order parameter decreases at elevated temperatures the Defect state becomes more stable, so D state grow back might occur. This is hindered by the "vertical" edge of the break.

Reduction of sensitivity to RMS induced latching or growback. This helps maintain a high aperture ratio for the pixels (i.e. brightness and contrast) in a multiplexed display despite application of a field. In practice this allows higher data voltages to be used and/or more lines to be addressed, and more regularly.

Widening of the bistability window—this enables bistability to be maintained for a wider range of grating shapes. This can be used to give lower voltage latching to one of the states. Although blanking to the other state may then require a longer time to latch, low voltage operation of the device with a fast overall frame time can be obtained.

The density of nucleation sites may also be controlled to give wider partial switch regions in a controllable fashion (rather than relying on variations across the cell) or reduced partial latching voltages. This in turn allows either more analogue levels to be achieved, or lower data voltages to be used (and hence reduced power).

The invention claimed is:

1. A liquid crystal device comprising:
   two cell walls; and
   a layer of liquid crystal material disposed between said two cell walls, at least one region on an internal surface of at least one cell wall comprising a surface alignment grating, said grating comprised of a plurality of grooves extending parallel to only a substantially single groove direction, wherein each of the surface alignment grating grooves includes at least one break extending along the groove, each of said breaks comprised of at least one discontinuity in each of said grooves, wherein the single groove direction is substantially the same on both sides of each of said plurality of breaks.

2. A liquid crystal device as claimed in claim 1 wherein the surface alignment profile on one side of the break is substantially the same as the surface alignment profile on the other side of the break along the groove direction.

3. A liquid crystal device as claimed in claim 1 wherein the break has a width in the groove direction that is less than 5 µm.

4. A liquid crystal device as claimed in claim 3 wherein the break has a width in the groove direction that is less than 0.25 µm.

5. A liquid crystal device as claimed in claim 1 wherein the device is a multistable device and the surface alignment grating comprises a multistable surface alignment grating.

6. A liquid crystal device as claimed in claim 1 wherein the breaks comprise a surface feature having a profile in a plane containing the grating normal and the groove direction which has at least one concave and at least one convex edge.

7. A liquid crystal device as claimed in claim 6 wherein the radius of curvature of the at least one convex or at least one concave edge is less than 2 µm.

8. A liquid crystal device as claimed in claim 6 wherein the at least one convex and at least one concave edge are joined by a surface, at least part of which is substantially parallel to the grating normal.

9. A liquid crystal device as claimed in claim 1 wherein at least one break comprises an area where the profile of a groove trough is raised.

10. A liquid crystal device as claimed in claim 9 wherein the profile of the groove trough at a break is raised to the same level as the groove peak.

11. A liquid crystal device as claimed in claim 1 wherein at least one break comprises an area where the profile of a groove peak is lowered.

12. A liquid crystal device as claimed in claim 11 wherein the profile of the groove peak at the break is level with the groove trough.

13. A liquid crystal device as claimed in claim 1 wherein at least one break comprises an area where the grooves on each side of the break are displaced relative to each other in a direction having a component perpendicular to the groove direction.

14. A liquid crystal device as claimed in claim 13 wherein the grooves on either side of the break of displaced relative to each other in a direction substantially perpendicular to the groove direction.

15. A liquid crystal device as claimed in claim 13 wherein the relative displacement is substantially equal to half the groove period.

16. A liquid crystal device as claimed in claim 1 wherein the device is arranged such that within any pixel or sub-pixel less than 25% of the grating within that area comprises grooves not having a break within the area of the pixel or sub-pixel.

17. A liquid crystal device as claimed in claim 16 wherein the device is arranged such that within any pixel or sub-pixel less than 10% of the grating within that area comprises grooves not having a break within the area of the pixel or sub-pixel.

18. A liquid crystal device as claimed in claim 1 wherein the device is arranged such that at any point within the pixel or sub-pixel more than one break is encountered along the groove direction.

19. A liquid crystal device as claimed in claim 18 wherein the breaks along the groove direction are separated by a distance which is at least double the groove pitch.

20. A liquid crystal device as claimed in claim 19 wherein the breaks along the groove direction are separated by a distance which is at least 10 µm.

21. A liquid crystal device as claimed in claim 1 wherein the grating is a zenithal bistable surface grating.

22. A liquid crystal device as claimed in claim 1 wherein the grating profiles on either side of the break in the groove direction are substantially the same.

23. A liquid crystal device as claimed in claim 1 where said discontinuity is formed by a change in phase of the grating.

24. A liquid crystal device as claimed in claim 1 where said discontinuity is formed by a change in amplitude of the grating.

25. A liquid crystal device comprising a layer of liquid crystal material disposed between two cell walls, at least one region on the internal surface of at least one cell wall comprising a surface alignment grating having a single groove direction characterised in that the surface alignment grating comprises a plurality of breaks along the groove direction, wherein at least one break comprises an area where the grooves on each side of the break are displaced relative to each other in a direction having a component perpendicular to the groove direction, wherein the relative displacement is substantially equal to a quarter of the groove period.

* * * * *